US006665104B2

(12) United States Patent
Rodgers et al.

(10) Patent No.: US 6,665,104 B2
(45) Date of Patent: Dec. 16, 2003

(54) MIRROR POSITIONING ASSEMBLY WITH VERTICAL FORCE COMPONENT COMPENSATION

(75) Inventors: Murray Steven Rodgers, Albuquerque, NM (US); Samuel Lee Miller, Albuquerque, NM (US); Stephen Matthew Barnes, Albuquerque, NM (US); Jeffry Joseph Sniegowski, Tijeras, NM (US); Paul Jackson McWhorter, Albuquerque, NM (US)

(73) Assignee: MEMX, Inc., Albuquerque, NM (US)

( * ) Notice: Subject to any disclaimer, the term of this patent is extended or adjusted under 35 U.S.C. 154(b) by 62 days.

(21) Appl. No.: 10/097,127

(22) Filed: Mar. 12, 2002

(65) Prior Publication Data

US 2003/0174421 A1 Sep. 18, 2003

(51) Int. Cl.[7] ............................. G02B 26/08; G02F 1/29
(52) U.S. Cl. ........................ 359/224; 359/298; 310/309
(58) Field of Search ................................. 359/198, 223, 359/224, 290, 298, 872, 877; 310/309; 385/18

(56) References Cited

U.S. PATENT DOCUMENTS

| 4,740,410 | A | | 4/1988 | Muller et al. ............... 428/133 |
|---|---|---|---|---|
| 5,358,908 | A | | 10/1994 | Reinberg et al. ............ 437/228 |
| 5,563,466 | A | | 10/1996 | Rennex et al. ............... 310/309 |
| 5,690,841 | A | | 11/1997 | Elderstig ..................... 216/39 |
| 5,726,073 | A | | 3/1998 | Zhang et al. ................ 437/228 |
| 5,862,003 | A | | 1/1999 | Saif et al. .................... 359/871 |
| 5,867,302 | A | * | 2/1999 | Fleming ...................... 359/291 |
| 6,020,564 | A | | 2/2000 | Wang et al. ................. 200/181 |
| 6,114,794 | A | | 9/2000 | Dhuler et al. ............... 310/307 |
| 6,122,090 | A | | 9/2000 | Kino et al. .................. 359/224 |
| 6,143,583 | A | | 11/2000 | Hays ........................... 438/39 |
| 6,146,543 | A | | 11/2000 | Tai et al. ..................... 216/2 |
| 6,175,170 | B1 | | 1/2001 | Kota et al. ................... 310/40 |
| 6,220,561 | B1 | * | 4/2001 | Garcia ......................... 248/487 |
| 6,253,001 | B1 | | 6/2001 | Hoen .......................... 385/17 |
| 6,283,601 | B1 | | 9/2001 | Hagelin et al. .............. 359/871 |
| 6,292,600 | B1 | * | 9/2001 | Goldstein et al. ............. 385/18 |
| 2001/0048265 | A1 | | 12/2001 | Miller et al. ................. 310/309 |

* cited by examiner

Primary Examiner—Mark A. Robinson
(74) Attorney, Agent, or Firm—Marsh Fischmann & Breyfogle LLP

(57) ABSTRACT

A microelectromechanical system is disclosed that constrains the direction of a force acting on a first load, where the force originates from the interaction of the first load and a second load. In particular, the direction of a force acting on the first load is caused to be substantially parallel with a motion of the first load. This force direction constraint is achieved by a force isolator microstructure that contains no rubbing or contacting surfaces. Various embodiments of structures/methods to achieve this force direction constraint using a force isolator microstructure are disclosed.

32 Claims, 17 Drawing Sheets

MIRROR POSITIONING ASSEMBLY WITH VERTICAL FORCE COMPONENT COMPENSATION

FIELD OF THE INVENTION

The present invention generally relates to the field of microelectromechanical systems and, more particularly, to a microelectromechanical system that constrains the direction of forces acting on a load in a manner such that there is also a reduced potential for rubbing or contact between different portions of the system.

BACKGROUND OF THE INVENTION

There are a number of microfabrication technologies that have been utilized for making microstructures (e.g., micromechanical devices, microelectromechanical devices) by what may be characterized as micromachining, including LIGA (Lithographie, Galvonoformung, Abformung), SLIGA (sacrificial LIGA), bulk micromachining, surface micromachining, micro electrodischarge machining (EDM), laser micromachining, 3-D stereolithography, and other techniques. Bulk micromachining has been utilized for making relatively simple micromechanical structures. Bulk micromachining generally entails cutting or machining a bulk substrate using an appropriate etchant (e.g., using liquid crystal-plane selective etchants; using deep reactive ion etching techniques). Another micromachining technique that allows for the formation of significantly more complex microstructures is surface micromachining. Surface micromachining generally entails depositing alternate layers of structural material and sacrificial material using an appropriate substrate which functions as the foundation for the resulting microstructure. Various patterning operations (collectively including masking, etching, and mask removal operations) may be executed on one or more of these layers before the next layer is deposited so as to define the desired microstructure(s). After the microstructure(s) has been defined in this general manner, the various sacrificial layers are removed by exposing the microstructure(s) and the various sacrificial layers to one or more etchants. This is commonly called "releasing" the microstructure(s) from the substrate, typically to allow at least some degree of relative movement between the microstructure(s) and the substrate. The etchant is biased to the sacrificial material to remove the same at a greater rate than the structural material. Preferably, the microstructure(s) is released without allowing the etchant to have an adverse impact on the structural material of the microstructure(s).

Microelectromechanical systems are typically actuated in a manner where the direction of the load forces are substantially collinear with the motion of the actuator. However, for some actuation systems, the load may be permitted to move in a path that is not collinear with the motion of the actuator (e.g., where the load moves out of plane). Off-axis forces (i.e., non-collinear) can result that can be detrimental to the operation of the actuator. For instance, actuator electrodes may short together or portions of the actuator may contact other surfaces of the microelectromechanical system, thereby adversely impacting the motion of the actuator. It would be desirable for the portion the load force that is transmitted to the actuator to be constrained to be at least substantially collinear with the motion of the actuator, thereby facilitating the proper operation of the actuator. In other words, it would be desirable for off-axis components of the load force to be isolated from the actuator by a force isolation system of sorts, or equivalently, by some way of constraining the direction of the force acting on the actuator. For most applications, and particularly for applications involving precise positioning of optical elements, it would be further desirable to provide this force isolation function in a manner that does not exhibit hysteretic behavior. This generally means that it would be desirable for none of the surfaces of such a force isolation system to come into contact or rub during normal operation of the microelectromechanical system.

BRIEF SUMMARY OF THE INVENTION

A primary object of the present invention is to at least attempt to minimize off-axis forces of a load acting on a given microstructure, and do so in a way that does not produce rubbing or contacting surfaces. In one application of the present invention, the noted microstructure is an actuator. In this case, the present invention enables precise positioning of optical elements that involve out-of-plane motion, without exhibiting hysteretic behavior.

A first aspect of the present invention is embodied by a mirror positioning system that is fabricated using a substrate. The system includes a mirror that is interconnected with a portion of a first lever that is able to move relative to the substrate. The system further includes an actuator assembly that is interconnected with the substrate so as to be able to move relative thereto along a first path. A coupling assembly interconnects the actuator assembly with a portion of the first lever that is able to move relative to the substrate. Depending upon the direction that the actuator assembly moves along the first path, a first lever end either moves at least generally away from or toward the substrate, as will the portion of the mirror that is interconnected with the first lever. Movement of the actuator assembly and the resultant movement of the first lever end relative to the substrate exerts a force on the coupling assembly that is not collinear with the first path along with the actuator assembly moves. The mirror positioning system of the first aspect is configured to address this situation in at least two respects. One is that the mirror positioning system of the first aspect is configured to redirect the application of such a force to the actuator assembly so as to be at least generally collinear with the first path along which the actuator assembly moves relative to the substrate. Another is that the mirror positioning system of the first aspect is configured such that no portion of the coupling assembly is deflected by such a non-collinear force into contact with the substrate.

Various refinements exist of the features noted in relation to the subject first aspect of the present invention. Further features may also be incorporated in the subject first aspect of the present invention as well. These refinements and additional features may exist individually or in any combination. The mirror may provide any appropriate optical function, including without limitation to reflect an optical signal, to change the direction of an optical signal, to change the focus of an optical signal, to attenuate an optical signal, to diffract an optical signal, or any combination thereof. The mirror may be interconnected with the substrate in any appropriate manner, including without limitation directly by pivotally interconnecting the mirror with the substrate utilizing one or more compliant members, indirectly via the first lever, or a combination thereof (e.g., by interconnecting one or more portions of the mirror with the substrate with one or more compliant members or flexures, and also by interconnecting one or more other portions of the mirror with the first lever). "Pivotally interconnecting" or the like, as used herein, means any type of interconnection that allows a microstructure to at least generally undergo a pivoting or pivotal-like motion when exposed to an appropriate force, including without limitation any interconnection that allows a microstructure or a portion thereof to move at least generally about a certain axis. Representative pivotal interconnections include the use of a flexing or elastic deformation of a microstructure or a portion thereof, as well as the use of relative motion between two or more microstructures that are typically in interfacing relation during at least a portion of the relative movement (e.g., a hinge connection; a ball and socket connection).

The first lever may be interconnected with the substrate in any manner such that at least part of the first lever is able to move at least generally away from or toward the substrate. Whether at least part of the first lever moves at least generally away from or at least generally toward the substrate is dependent upon the direction of the resulting force that is acting on the first lever as noted above. Any way of interconnecting the first lever with the substrate that allows for the desired relative movement between the first lever and the substrate may be utilized. In addition, any configuration may be used for the first lever that allows for the desired relative movement between the first lever and the substrate (e.g., single or multiple beam structures of any appropriate configuration). The desired movement of the first lever relative to the substrate may be along any path (e.g., along an arcuate path) and in any orientation relative to the substrate (e.g., along a path that is normal to the substrate; along a path that is at an angle other than 90° relative to the substrate).

The actuator assembly of the first aspect may include at least one actuator. That is, the actuator assembly may include a single actuator or multiple actuators that exert a concerted or collective force (directly or indirectly) on the first lever through the coupling assembly. If multiple actuators are used, the first path may be viewed as the cumulative path along which the actuators move. Any appropriate type of an actuator may be utilized in the case of the first aspect, including without limitation an electrostatic comb actuator, a thermal actuator, a piezoelectric actuator, a magnetic actuator, and an electromagnetic actuator. Control of the movement of any actuator assembly may be accomplished in any appropriate manner as well. In one embodiment, the signal that is used to control the movement of the actuator assembly originates external to a microelectromechanical system that may include the mirror positioning system of the first aspect. Both open loop and closed loop configurations may also be used for controlling the operation of the actuator assembly. Movement of the actuator assembly may be active (e.g., as a result of the application of or a change in an external signal thereto), passive (e.g., utilizing a stored spring force or the like), or a combination thereof.

The coupling assembly utilized by the first aspect may be of any relevant configuration, may include one or more microstructures, and broadly encompasses the entirety of the structural interconnection between the actuator assembly and the first lever. The coupling assembly may include a coupling or tether that is interconnected (directly or indirectly) with both the actuator assembly and the first lever. Any appropriate configuration may be used for any such tether. In at least certain applications, it may be desirable to have this tether be "stiff." A "stiff tether" means that such a tether is sufficiently stiff so as to not buckle, flex, or bow to any significant degree when exposed to external forces typically encountered during normal operation of the mirror positioning system. As such, no significant elastic energy is stored in the tether, the release of which could adversely affect one or more aspects of the operation of the mirror positioning system.

Other microstructures that may be included in the coupling assembly of the first aspect include a pivotless compliant microstructure that will be discussed in more detail below. In one embodiment, the coupling assembly microstructure includes both a pivotless compliant microstructure and a tether of the above-described. The actuator assembly may be appropriately interconnected with an input section of the pivotless compliant microstructure, the tether may extend between and interconnect an output section of the pivotless compliant microstructure with the first lever, and the mirror is appropriately interconnected with a portion of the first lever that is able to move at least generally away from or toward the substrate, depending on the direction of motion of the actuator assembly.

One way in which the force redirection function associated with the first aspect may be addressed (the "first condition") at least in part is through the use of one or more doubly clamped beams. One or more doubly clamped beams or the like may be attached to one or more appropriate portions of the coupling assembly to limit the amount of vertical movement of the same relative to the substrate when exposed to a vertical force component, which in turn reduces the magnitude of the vertical force component that is ultimately transmitted to the actuator assembly. Doubly clamped beams are microstructures that are anchored to the substrate at least at one location on each side of the portion of the coupling assembly to which the given doubly clamped beam is anchored or attached.

An appropriately configured pivotless compliant microstructure may be incorporated into the coupling assembly in the case of the first aspect to at least assist in the provision of the force redirection function (the "first condition"). A pivotless compliant microstructure, as used herein, means a microstructure having: 1) a plurality of flexible beams that are each attached or anchored (directly or indirectly) to the substrate at a discrete location so as to be motionless relative to the substrate at the attachment or anchor location, and such that other portions of each such flexible beam are able to move relative to the substrate by a flexing or bending-like action; 2) a plurality of cross beams that are not attached to the substrate (other than through an interconnection with one or more flexible beams), and that either interconnect a pair of flexible beams at a location that is able to move relative to the substrate or that interconnect with one or more other cross beams; 3) an appropriate input structure (e.g., a single beam; a yoke) and an appropriate output structure (e.g., a single beam; a yoke); and 4) of a configuration that exploits elastic deformation to achieve a desired movement of the input structure and the output structure relative to the substrate. Stated another way, all movement the pivotless compliant microstructure is through a flexing of the same at/about one or more locations where the structure is anchored to the substrate. This pivotless compliant microstructure may be configured to achieve any type/amount of motion of its input structure relative to its output structure. For instance, the input and output structures may move the same or different amounts in the lateral dimension (at least generally parallel with the plane of the substrate). In the case where the output structure of the pivotless compliant microstructure moves more than its input structure, the pivotless compliant microstructure may be referred to as a displacement multiplier. Therefore, a displacement multiplier is one type of pivotless compliant microstructure which may be utilized in relation to the first aspect.

Further features may be incorporated into the above-noted pivotless compliant microstructure in the case of the first aspect to enhance the manner in which a force from the movement of the first lever end relative to the substrate is transmitted to actuator assembly so as to be collinear with the direction in which the actuator assembly moves relative to the substrate (the "first condition"), to reduce the potential for contact with the underlying substrate (the "second condition"), or a combination thereof. For instance, the pivotless compliant microstructure may utilize a relief structure as its output structure and that is attached to a tether of the above-noted type, that in turn is attached to the first lever. This relief structure may be configured to reduce the amount that other portions of the pivotless compliant microstructure deflect toward the underlying substrate when non-collinear forces are exerted on the relief structure and the input structure. Both the bending stiffness of this relief structure, how/where the relief structure is attached to the remainder of the pivotless compliant microstructure, or both may be selected such that the torque that is exerted on the remainder of the pivotless compliant microstructure by the first lever/mirror reduces the potential for deflecting any portion of the pivotless compliant microstructure toward the substrate in an amount so as to contact any underlying structure during normal operation of the mirror positioning system of the first aspect.

Other options may be utilized to address reducing the potential for undesired contact between portions of the microelectromechanical system of the first aspect when using a pivotless compliant microstructure as at least part of the coupling assembly. For instance, the pivotless compliant microstructure may be allowed to move at least generally away from the substrate so as to increase the spacing from the underlying structure and including the substrate. The pivotless compliant microstructure may be mounted on a frame (typically at four anchor locations, although any appropriate number of anchor locations may be utilized), that in turn is pivotally interconnected with the substrate or that is interconnected with the substrate so as to allow at least part of the frame to be able to move at least generally away from the substrate. This frame may be configured as a one-piece structure or by a plurality of individual frame segments that are each interconnected with the substrate in the above-noted manner and that collectively define the frame. Moreover, this frame may be configured so as to be rigid or so as to not flex to a significant degree, or at least may be configured so as to be more rigid than the pivotless compliant microstructure that is mounted thereon. In this case the pivotless compliant microstructure would move at least generally away from the substrate (or further from the substrate) when exposed to non-collinear forces at its input and output structures by a pivoting of the "free end" of the frame at least generally away from the substrate. Another option is for the frame to be defined by one or more pre-stressed elevators. A "pre-stressed elevator" is a structure that may be made by surface micromachining, and that when released (after being exposed to one or more release etchants to remove a sacrificial material used in the fabrication of the mirror positioning system of the first aspect, and likely further after having one or more retention pins, fuses, or the like blown or ruptured (a retention pin, fuse, or the like being used to retain the prestressed elevators in a predetermined position relative to the substrate until operation of the mirror positioning system is initiated)) has at least a portion thereof change its position relative to the substrate. For instance, such a pre-stressed elevator may be anchored to the substrate during fabrication such that when released in the above-noted manner, at least one end of the pre-stressed elevator moves at least generally away from the substrate as a result of the energy stored therein during fabrication. Stated another way, a pre-stressed elevator may have a bent or curled configuration in the static state. Mounting the pivotless compliant microstructure on a portion of one or more of these pre-stressed elevators thereby increases the spacing between the pivotless compliant microstructure and the substrate, even prior to exposing its input and output structures to non-collinear forces. Yet another option is to pivotally interconnect the pivotless compliant microstructure itself with the substrate so as to allow part of the pivotless compliant microstructure to move at least generally away from the substrate when exposed to non-collinear forces. In one embodiment, this pivotal interconnection of the pivotless compliant microstructure is provided by limiting the anchor locations of the pivotless compliant microstructure to the substrate to being at least generally disposed along a common reference axis (e.g., anchoring the pivotless compliant microstructure at a pair of locations, which at least generally define a pivot axis).

Another option for reducing the potential for contact as a result of non-collinear forces being exerted on the input and output structure of a pivotless compliant microstructure is by forming a cavity under at least a portion of the pivotless compliant microstructure (or stated another way to increase the distance between at least a certain portion of the pivotless compliant microstructure and any underlying structure). Discrete cavities may be formed in the substrate under those portions of the pivotless compliant microstructure that are susceptible to being deflected the furthest in the direction of the substrate when exposed to non-collinear forces at its input and output structures. In this case, the spacing between those portions of the pivotless compliant microstructure that are susceptible to the most deflection could be spaced further from the underlying substrate than other portions of the pivotless compliant microstructure in the static state. Yet another option is to dispose the entire pivotless compliant microstructure in a cavity that is formed in the substrate. A related option would be to dispose at least a substantial portion of the pivotless compliant microstructure and its anchors to the substrate within a single cavity that is formed in the substrate. For instance, a single cavity could be formed in the substrate and all free ends or nodes of the pivotless compliant microstructure could be disposed in this single cavity. "Free ends" or "nodes" in this sense are those portions of the pivotless compliant microstructure that in effect are the extreme end of a cantilever or the like. Although the anchors between the pivotless compliant microstructure and the substrate may be disposed within a single cavity, in one embodiment all of the anchors between the pivotless compliant microstructure and the substrate are disposed outside of this cavity, while the remainder of the pivotless compliant microstructure is disposed within this single cavity.

Controlling the spacing between at least certain portions of the pivotless compliant microstructure and the underlying substrate may be used to address the second condition in relation to the first aspect as noted. In one embodiment, at least a portion of the pivotless compliant microstructure and the underlying substrate are separated by a space of at least about 7 microns. More preferably, each of the above-noted "free ends" or "nodes" of the pivotless compliant microstructure are separated from the underlying substrate by the above-noted spacing. One way in which this may be achieved for the mirror positioning system of the first aspect when fabricated by surface micromachining techniques is to form the various beams of the pivotless compliant microstructure from only two of the structural layer levels in this system.

Selecting the locations where the pivotless compliant microstructure is anchored to the substrate may also address the potential for undesired contact between different portions of the mirror positioning system of the first aspect due to the existence of non-collinear forces being exerted on the coupling assembly. The pivotless compliant microstructure may be characterized as having a longitudinal extent progressing from its input structure to its output structure along a central, longitudinal reference axis. A pair of "lateral" extremes of the pivotless compliant microstructure are disposed on opposite sides of this central, longitudinal reference axis and correspond with those portions of the pivotless compliant microstructure that are disposed furthest from this central, longitudinal reference axis. All anchor locations of the pivotless compliant microstructure to the substrate may be disposed at least as far from the output structure of the pivotless compliant microstructure (measured along the central, longitudinal reference axis or a parallel axis) as these lateral extremes to address the second condition of the first aspect. Stated another way, all anchor locations of the pivotless compliant microstructure to the substrate are disposed no farther from the input structure of the pivotless compliant microstructure than the noted lateral extremes, again measured along the central, longitudinal reference axis or a parallel axis.

A second aspect of the present invention is embodied in a microelectromechanical system that includes a substrate and a pivotless compliant microstructure of the type discussed above in relation to the first aspect. An appropriate load is interconnected with both the input and output structures of the pivotless compliant microstructure. For instance, an actuator assembly of the type discussed above in relation to the first aspect may be interconnected with the input structure, while a tether of the type discussed above in relation to the first aspect may be interconnected with the output structure of the pivotless compliant microstructure. Regardless of the actual loads that are interconnected with the input and output structures, the pivotless compliant microstructure of the second aspect utilizes a relief structure at its output structure. This relief structure is configured to reduce the amount that other portions of the pivotless compliant microstructure deflect toward the underlying substrate when non-collinear forces are exerted on the relief structure and the: input structure. Both the bending stiffness of this relief structure, how/where the relief structure is attached to the remainder of the pivotless compliant microstructure, or both may be selected such that the torque that is exerted on the remainder of the pivotless compliant microstructure by the first lever/mirror reduces the potential for deflecting any portion of the pivotless compliant microstructure toward the substrate in an amount so as to contact an underlying structure during normal operation of the microelectromechanical system.

A third aspect of the present invention is embodied in a microelectromechanical system that includes a substrate and a pivotless compliant microstructure of the type discussed above in relation to the first aspect. An appropriate load is interconnected with both the input and output structures of the pivotless compliant microstructure. For instance, an actuator assembly of the type discussed above in relation to the first aspect may be interconnected with the input structure, while a tether of the type discussed above in relation to the first aspect may be interconnected with the output structure of the pivotless compliant microstructure. Regardless of the actual loads that are interconnected with the input and output structures, a plurality of interconnected beams of the pivotless compliant microstructure are disposed between its input and output structures, and pivot relative to the substrate and/or other beams of the pivotless compliant microstructure to provide a desired lateral displacement between the input and output structures. At least two beams of the pivotless compliant microstructure extend at least generally away from each other at a first longitudinal location (relative to the central, longitudinal reference axis of the pivotless compliant microstructure). The input structure of the pivotless compliant microstructure is disposed at a second longitudinal location (relative to the noted central, longitudinal reference axis) that is spaced from this first longitudinal location. Where an appropriate load attaches to the output structure of the pivotless compliant microstructure is disposed at a third longitudinal location (relative to the noted central, longitudinal reference axis) that is between the first and second longitudinal locations.

A fourth aspect of the present invention is embodied in a microelectromechanical system that includes a substrate and a pivotless compliant microstructure of the type discussed above in relation to the first aspect. An appropriate load is interconnected with both the input and output structures of the pivotless compliant microstructure. For instance, an actuator assembly of the type discussed above in relation to the first aspect may be interconnected with the input structure, while a tether of the type discussed above in relation to the first aspect may be interconnected with the output structure of the pivotless compliant microstructure. Regardless of the actual loads that are interconnected with the input and output structures, the pivotless compliant microstructure is interconnected with the substrate so that its output structure is able to move at least generally away from the substrate so as to increase the spacing from the underlying structure.

Various refinements exist of the features noted in relation to the subject fourth aspect of the present invention. Further features may also be incorporated in the subject fourth aspect of the present invention as well. These refinements and additional features may exist individually or in any combination. Any number of options may be employed to realize the above-noted type of movement pivotless compliant microstructure. The pivotless compliant microstructure may be mounted on a frame (typically at four anchor locations, although any appropriate number of anchor locations may be utilized), that in turn is pivotally interconnected with the substrate or that is interconnected with the substrate so as to allow at least part of the frame to be able to move at least generally away from the substrate. This frame may be configured as a one-piece structure or by a plurality of individual frame segments that are each interconnected with the substrate in the above-noted manner and that collectively define the frame. Moreover, this frame may be configured so as to be rigid or so as to not flex to a significant degree, or at least may be configured so as to be more rigid than the pivotless compliant microstructure that is mounted thereon. In this case the pivotless compliant microstructure would move at least generally away from the substrate (or further from the substrate) when exposed to non-collinear forces at its input and output structures by a pivoting of the "free end" of the frame at least generally away from the substrate.

Another option is for the above-noted frame for the fourth aspect to be defined by on one or more pre-stressed elevators. A "pre-stressed elevator" is a structure that may be made by surface micromachining, and that when released (after being exposed to one or more release etchants to remove a sacrificial material used in the fabrication of the microelectromechanical system of the first aspect, and likely further after having one or more retention pins, fuses, or the like blown or ruptured (a retention pin, fuse, or the like being used to retain the prestressed elevators in a predetermined position relative to the substrate until operation of the mirror positioning system is initiated)) has at least a portion thereof change its position relative to the substrate. For instance, such a pre-stressed elevator may be anchored to the substrate during fabrication such that when released in the above-noted manner, at least one end of the prestressed elevator moves at least generally away from the substrate as a result of the energy stored therein during fabrication. Stated another way, a pre-stressed elevator may have a bent or curled configuration in the static state. Mounting the pivotless compliant microstructure on a portion of one or more of these pre-stressed elevators thereby increases the spacing between the pivotless compliant microstructure and the substrate, even prior to exposing its input and output structures to non-collinear forces.

Yet another option that may be employed in relation to the fourth aspect is to pivotally interconnect the pivotless compliant microstructure itself with the substrate so as to allow part of the pivotless compliant microstructure to move at least generally away from the substrate when exposed to non-collinear forces. In one embodiment, this pivotal interconnection of the pivotless compliant microstructure is provided by limiting the anchor locations of the pivotless compliant microstructure to the substrate to being at least generally disposed along a common reference axis. In another embodiment, the pivotless compliant microstructure is interconnected with the substrate at only two locations.

A fifth aspect of the present invention is embodied in a microelectromechanical system that includes a substrate and a pivotless compliant microstructure of the type discussed above in relation to the first aspect. An appropriate load is interconnected with both the input and output structures of the pivotless compliant microstructure. For instance, an actuator assembly of the type discussed above in relation to the first aspect may be interconnected with the input structure, while a tether of the type discussed above in relation to the first aspect may be interconnected with the output structure of the pivotless compliant microstructure. Regardless of the actual loads that are interconnected with the input and output structures, a cavity is formed under at least a portion of the pivotless compliant microstructure (or stated another way to increase the distance between at least a certain portion of the pivotless compliant microstructure and the substrate).

Various refinements exist of the features noted in relation to the subject fifth aspect of the present invention. Further features may also be incorporated in the subject fifth aspect of the present invention as well. These refinements and additional features may exist individually or in any combination. Discrete cavities may be formed in the substrate under those portions of the pivotless compliant microstructure that are susceptible to being deflected the furthest in the direction of the substrate when exposed to non-collinear forces. In this case, the spacing between those portions of the pivotless compliant microstructure that are susceptible to the most deflection could be spaced further from the underlying substrate than other portions of the pivotless compliant microstructure in the static state. Yet another option is to dispose the entire pivotless compliant microstructure in a cavity that is formed in the substrate. A related option would be to dispose at least a substantial portion of the pivotless compliant microstructure and its anchors to the substrate within a single cavity that is formed in the substrate. For instance, a single cavity could be formed in the substrate and all free ends or nodes of the pivotless compliant microstructure could be disposed in this single cavity. "Free ends" or "nodes" in this sense are those portions of the pivotless compliant microstructure that in effect are the extreme end of a cantilever or the like. Although the anchors between the pivotless compliant microstructure and the substrate may be disposed within a single cavity, in one embodiment all of the anchors between the pivotless compliant microstructure and the substrate are disposed outside of this cavity, while the remainder of the pivotless compliant microstructure is disposed within this single cavity.

A sixth aspect of the present invention is embodied in a microelectromechanical system that includes a substrate and a pivotless compliant microstructure of the type discussed above in relation to the first aspect. An appropriate load is interconnected with both the input and output structures of the pivotless compliant microstructure. For instance, an actuator assembly of the type discussed above in relation to the first aspect may be interconnected with the input structure, while a tether of the type discussed above in relation to the first aspect may be interconnected with the output structure of the pivotless compliant microstructure. Regardless of the actual loads that are interconnected with the input and output structures, the pivotless compliant microstructure may be characterized as having a longitudinal extent progressing from its input structure to its output structure along a central, longitudinal reference axis. A pair of "lateral" extremes of the pivotless compliant microstructure are disposed on opposite sides of this central, longitudinal reference axis and correspond with those portions of the pivotless compliant microstructure that are disposed furthest from this central, longitudinal reference axis. All anchor locations of the pivotless compliant microstructure to the substrate may be disposed at least as far from the output structure of the pivotless compliant microstructure (measured along the central, longitudinal reference axis or a parallel axis) as these lateral extremes to address the second condition of the first aspect. Stated another way, all anchor locations of the pivotless compliant microstructure to the substrate are disposed no farther from the input structure of the pivotless compliant microstructure than the noted lateral extremes, again measured along the central, longitudinal reference axis or a parallel axis.

A seventh aspect is embodied by a microelectromechanical system that includes first and second loads that are interconnected by a coupling assembly. The first and second loads exert non-collinear forces on the coupling assembly. At least one doubly clamped beam is attached to at least one part of the coupling assembly to address the existence of these non-collinear forces. One or more doubly clamped beams or the like may be attached to one or more appropriate portions of the coupling assembly to limit the amount of vertical movement of the same relative to the substrate when exposed to a vertical force component, which in turn reduces the magnitude of the vertical force component that is ultimately transmitted to the actuator assembly. Doubly clamped beams are microstructures that are anchored to the substrate at least at one location on each side of the portion of the coupling assembly to which the given doubly clamped beam is anchored or attached.

The various aspects of the present invention may be used alone or in any desired combination. In one embodiment, the first aspect utilizes the features discussed in relation to the second aspect and the fifth aspects. Moreover, each of the second through the eighth aspects may be used in a mirror positioning system that includes a mirror, a first lever, an actuator assembly, and a coupling assembly of the type discussed above in relation to the first aspect.

DETAILED DESCRIPTION OF THE INVENTION

Figure 1A:
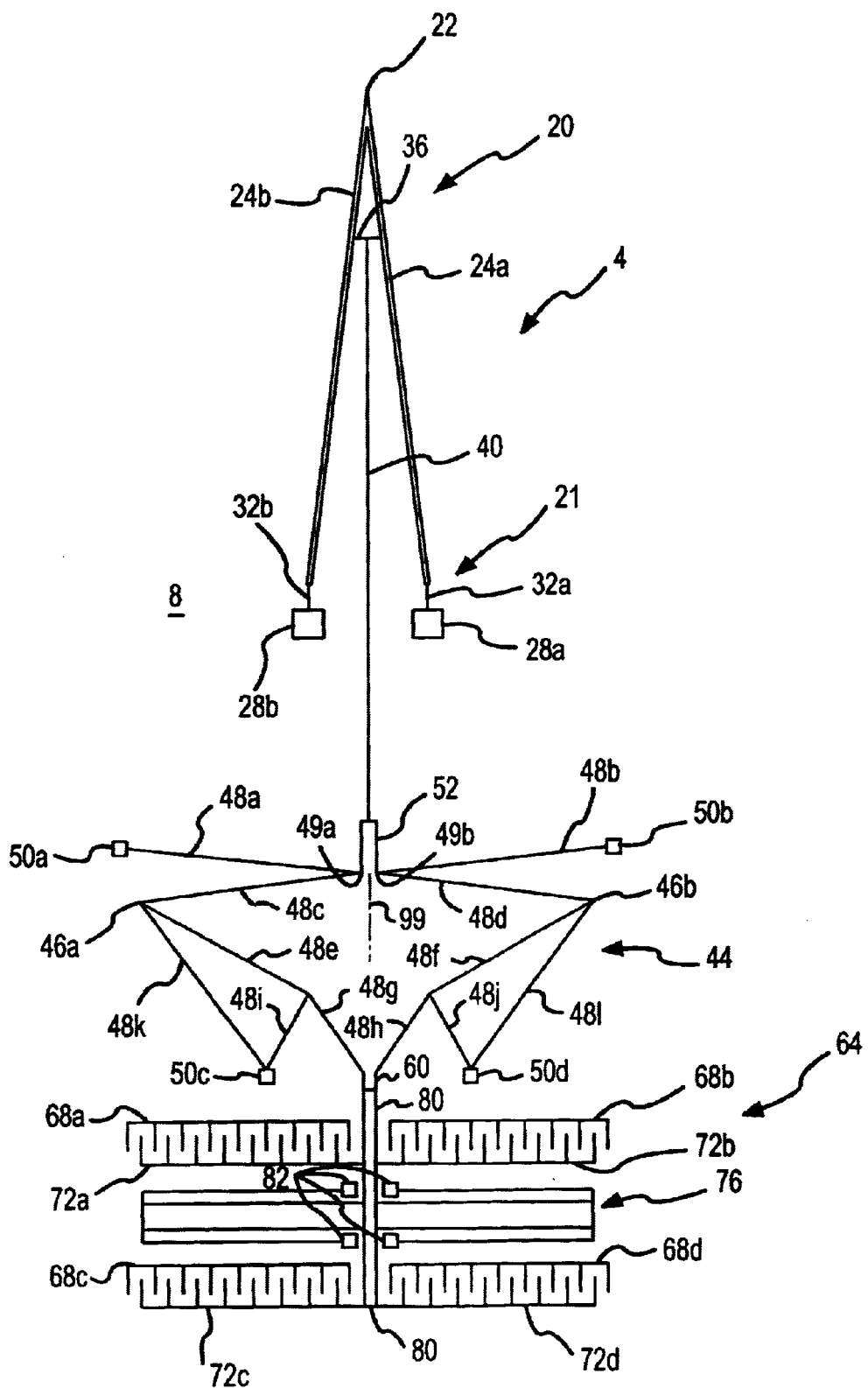
FIG. 1A is a plan view of one embodiment of a microelectromechanical system that includes a positioning assembly.

The present invention will now be described in relation to the accompanying drawings which at least assist in illustrating its various pertinent features. The various embodiments to be described herein, and the subject matter presented in the accompanying claims, are limited to microelectromechanical systems. One or more microdevices or microstructures may define any given microelectromechanical system. In any case, a substrate is used in the fabrication of each type of microelectromechanical system contemplated by the inventors. The term "substrate" as used herein means those types of structures that can be handled by the types of equipment and processes that are used to fabricate micro-devices or microstructures on, within, and/or or from a substrate using one or more microphotolithographic patterns. Although surface micromachining is the preferred type of technique for fabricating the microelectromechanical systems described herein, other techniques may be utilized as well. Moreover, in certain instances it may be desirable to use a combination of two or more fabrication techniques to define a given microelectromechanical system.

Since surface micromachining is the preferred fabrication technique for the microelectromechanical systems described herein, the basis principles of surface micromachining will first be described. Initially, various surface micromachined microstructures and surface micromachining techniques are disclosed in U.S. Pat. Nos. 5,783,340, issued Jul. 21, 1998, and entitled "METHOD FOR PHOTOLITHOGRAPHIC DEFINITION OF RECESSED FEATURES ON A SEMICONDUCTOR WAFER UTILIZING AUTOFOCUSING ALIGNMENT"; U.S. Pat. No. 5,798,283, issued Aug. 25, 1998, and entitled "METHOD FOR INTEGRATING MICROELECTROMECHANICAL DEVICES WITH ELECTRONIC CIRCUITRY; U.S. Pat. No. 5,804,084, issued Sep. 8, 1998, and entitled "USE OF CHEMICAL MECHANICAL POLISHING IN MICROMACHINING"; U.S. Pat. No. 5,867,302, issued Feb. 2, 1999, and entitled "BISTABLE MICROELECTROMECHANICAL ACTUATOR"; and U.S. Pat. No. 6,082,208, issued Jul. 4, 2000, and entitled "METHOD FOR FABRICATING FIVE-LEVEL MICROELECTROMECHANICAL STRUCTURES AND MICROELECTROMECHANICAL TRANSMISSION FORMED, the entire disclosures of which are incorporated by reference in their entirety herein.

Surface micromachining generally entails depositing typically alternate layers of structural material and sacrificial material using an appropriate substrate which functions as the foundation for the resulting microstructures. A dielectric isolation layer will typically be formed directly on an upper surface of the substrate on which such a microelectromechanical system is to be fabricated, and a structural layer will be formed directly on an upper surface of the dielectric isolation layer. This particular structural layer is typically patterned and utilized for establishing various electrical interconnections for the microelectromechanical system which is thereafter fabricated thereon. Other layers of sacrificial and structural materials are then sequentially deposited to define the various microstructures of the microelectromechanical system. Various patterning operations (again, collecting masking, etching, and mask removal operations) may be executed on one or more of these layers before the next layer is deposited so as to define the desired microstructure. After the various microstructures have been defined in this general manner, the desired portions of the various sacrificial layers are removed by exposing the "stack" to one or more etchants. This is commonly called "releasing" at least certain of the microstructures from the substrate, typically to allow at least some degree of relative movement between the microstructure(s) and the substrate. In certain situations, not all of the sacrificial material used in the fabrication is removed during the release. For instance, sacrificial material may be encased within a structural material to define a microstructure with desired characteristics (e.g., a prestressed elevator microstructure).

Exemplary material s for the above-noted sacrificial layers include undoped silicon dioxide or silicon oxide, and doped silicon dioxide or silicon oxide ("doped" indicating that additional elemental materials are added to the film during or after deposition). Exemplary materials for the structural layers include doped or undoped polysilicon and doped or undoped silicon. Exemplary materials for the substrate include silicon. The various layers described herein may be formed/deposited by techniques such as chemical vapor deposition (CVD) and including low-pressure CVD (LPCVD), atmospheric-pressure CVD (APCVD), and plasma-enhanced CVD (PECVD), thermal oxidation processes, and physical vapor deposition (PVD) and including evaporative PVD and sputtering PVD, as examples.

Surface micromachining can be done with any suitable system of a substrate, sacrificial film(s) or layer(s), and structural film(s) or layer(s). Many substrate materials may be used in surface micromachining operations, although the tendency is to use silicon wafers because of their ubiquitous presence and availability. The substrate again is essentially a foundation on which the microstructures are fabricated. This foundation material must be stable to the processes that are being used to define the microstructure(s) and cannot adversely affect the processing of the sacrificial/structural films that are being used to define the microstructure(s). With regard to the sacrificial and structural films, the primary differentiating factor is a selectivity difference between the sacrificial and structural films to the desired/required release etchant(s). This selectivity ratio is preferably several hundred to one or much greater, with an infinite selectivity ratio being preferred. Examples of such a sacrificial film/structural film system include: various silicon oxides/various forms of silicon; poly germanium/poly germanium-silicon; various polymeric films/various metal films (e.g., photoresist/aluminum); various metals/various metals (e.g., aluminum/nickel); polysilicon/silicon carbide; silicon dioxide/polysilicon (i.e., using a different release etchant like potassium hydroxide, for example). Examples of release etchants for silicon dioxide and silicon oxide sacrificial materials are typically hydrofluoric (HF) acid based (e.g., undiluted or concentrated HF acid, which is actually 49 wt % HF acid and 51 wt % water; concentrated HF acid with water; buffered HF acid (HF acid and ammonium fluoride)).

Only those portions of a microelectromechanical system that are relevant to the present invention will be described in relation to the following embodiments. The entirety of these various embodiments of microelectromechanical systems are defined by a plurality of microstructures, including structures that span feature sizes of less than 1 micron to many hundreds of microns. For convenience, the word "microstructure" may not be repeated in each instance in relation to each of these components. However, each such component is in fact a microstructure and "microstructure" is a structural limitation in the accompanying claims. Since the same (structurally and/or functionally) microstructure may be used in a variety of these embodiments, a brief discussion of the least some of these microstructures will be provided in an attempt to minimize repetitious description.

One or more microstructures of the various embodiments of microelectromechanical systems to be described herein move relative to other portions of the microelectromechanical system, and including a substrate that is used in the fabrication of the microelectromechanical system. Unless otherwise noted as being a key requirement for a particular embodiment, this relative movement may be achieved in any appropriate manner. Surface micromachining fabrication techniques allow for relative movement without having any rubbing or sliding contact between a movable microstructure and another microstructure or the substrate. All movement of a surface micromachined microstructure relative to the substrate is provided by a flexing or elastic deformation of one or more microstructures of the microelectromechanical system. Another option that may be utilized to allow a given microstructure to move relative to the substrate is to interconnect two or more microstructures together in a manner such that there is relative movement between these microstructures while the microstructures are in interfacing relation at least at some point in time during the relative movement (e.g., a hinge connection; a ball and socket connection).

At least one actuator may be utilized by the various embodiments of microelectromechanical systems to be described herein. Unless otherwise noted as being a key requirement for a particular embodiment, each of the following actuator characteristics or attributes will be applicable. Any appropriate type of actuator may be utilized. Appropriate types of actuators include without limitation electrostatic comb actuators, thermal actuators, piezoelectric actuators, magnetic actuators, and electromagnetic actuators. Moreover, any appropriate way of interconnecting an actuator with the substrate may be utilized. One actuator may be utilized to exert the desired force on a given microstructure, or multiple actuators may be interconnected in a manner to collectively exert the desired force on a given microstructure. The movement of an actuator may be active (via a control signal or a change in a control signal), passive (by a stored spring force or the like), or a combination thereof.

One or more of the various embodiments of microelectromechanical systems to be described herein utilize what may be characterized as an elongate coupling or tether to interconnect two or more microstructures. Unless otherwise noted as being a key requirement for a particular embodiment, any appropriate configuration may be used for any such tether. In at least certain applications, it may be desirable to have this tether be "stiff." Cases where a tether of this configuration is desired or preferred will be referred to as a "stiff tether." A "stiff tether" means that such a tether is sufficiently stiff so as to not buckle, flex, or bow to any significant degree when exposed to external forces typically encountered during normal operation of the microelectromechanical system. As such, no significant elastic energy is stored in the tether, the release of which could adversely affect one or more aspects of the operation of the microelectromechanical system.

One or more of the various embodiments of microelectromechanical systems to be described herein may use an elevator or the like. This elevator is interconnected with the substrate in a manner such that at least part of the elevator is able to move at least generally away from or toward the substrate. Whether at least part of the elevator moves at least generally away from or at least generally toward the substrate is dependent upon the direction of the resulting force that is acting on the elevator. Unless otherwise noted as being a key requirement for a particular embodiment, each of the following elevator characteristics will be applicable. Any way of interconnecting the elevator with the substrate that allows for the desired relative movement between the elevator and the substrate may be utilized. Any configuration may be used for the elevator that allows for the desired relative movement between the elevator and the substrate may be utilized (single or multiple beam structures of any appropriate configuration). The desired movement of the elevator relative to the substrate may be along any path (e.g., along an arcuate path) and in any orientation relative to the substrate (e.g., along a path that is normal to the substrate; along a path that is at an angle other than 90° relative to the substrate).

One or more of the various embodiments of microelectromechanical systems to be described herein may use what is characterized as a displacement multiplier. A displacement multiplier is one type of pivotless compliant structure as noted above. Unless otherwise noted as being a key requirement for a particular embodiment, each of the following characteristics for a displacement multiplier will be applicable. Any layout of interconnected beams may be used to define the displacement multiplier, each of these beams may be of any appropriate configuration, and the displacement multiplier may be anchored to the substrate using any appropriate number of anchor locations and anchor location positionings. The input and output structures of the displacement multiplier may be of any appropriate configuration, and further may be disposed in any appropriate orientation relative to each other. The displacement multiplier may be configured to achieve any type/amount of motion of its input structure relative to its output structure. For instance, the input and output structures of the displacement multiplier may move the same or different amounts in the lateral dimension, and along any appropriate path. Although the displacement multiplier may be symmetrically disposed relative to a reference axis, such need not be the case.

One or more of the various embodiments of microelectromechanical systems to be described herein may use one or more doubly clamped beams. The basic function of such a doubly clamped beam is to compensate for the existence of non-collinear forces. This may be subject to a number of characterizations. One way to characterize this compensation is that such a doubly clamped beam redirects a force. Another way to characterize this compensation is that such a doubly clamped beam reduces the magnitude of a vertical force component that is transmitted to a microstructure to which the doubly clamped beam is anchored or attached. Any such doubly clamped beam includes a beam that is attached to another microstructure (e.g., to a tether), and further that is anchored to the substrate on both sides of this microstructure. In the case of a surface micromachined system, a given doubly clamped beam may be formed in the same structural layer as the microstructure to which the doubly clamped beam is attached (e.g., disposed the same distance from the substrate). The fixation or attachment of any such doubly clamped beam to such a microstructure in this case would be via an integral construction. That is, there would be no evident mechanical joint between the doubly clamped beam and the microstructure to which it is attached in this case. Each doubly clamped beam also may be formed from multiple, vertically spaced structural layers in a surface micromachined configuration, where these multiple structural layers are appropriately anchored to each other. However, the doubly clamped beam would still be somehow attached to the microstructure.

One embodiment of a positioning assembly 4 for a microelectromechanical system is illustrated in FIG. 1A. The positioning assembly 4 includes an actuator 64. Typically the actuator 64 will move in two different directions to either move the elevator 20 at least generally away from the substrate 8 or to move the elevator 20 at least generally toward the substrate 8. The actuator 64 is of the electrostatic type and includes several stationary electrodes 68a–d that are fixed to the substrate 8 and several moveable electrodes 72a–d that are attached to a moveable frame or output bar 80. The output bar 80 is supported above the substrate 8 by a folded support spring assembly 76 that is anchored to the substrate 8 at four anchor points 82 to permit lateral movement of the output bar 80 relative to the substrate 8. "Lateral" or the like as used herein means at least generally parallel with an upper surface or the general extent of the substrate 8 (for instance, "horizontal"). Upon application of a control voltage via electrical interconnects (not shown) across the electrodes 68a–d, 72a–d, the moveable electrodes 72a–d are pulled laterally towards the stationary electrodes 68a–d, thereby moving the output bar 80 laterally in one direction. The amount of lateral movement corresponds with the magnitude of the actuation voltage applied. When there is a change in the actuation voltage, the actuator 64 moves in the opposite direction utilizing at least the spring force that was originally stored in the support spring assembly 76 (i.e., forces from one or more other sources may contribute to this movement of the actuator 64).

The output bar 80 of the actuator 64 is appropriately coupled to a displacement multiplier 44. The displacement multiplier 44 includes a plurality of interconnected beams 48a-1 and is interconnected with the substrate 8 at four anchors locations 50a–d so as to pivot about these anchor locations 50a–d by a flexure of various of the beams 48 (typically those beams 48 that are directly attached to an anchor 50). An input structure or first coupling 60 of the displacement multiplier 44 is appropriately interconnected with the actuator 64 (more specifically the output bar 80), while an output structure or second coupling 52 of the displacement multiplier 44 is appropriately interconnected with an elongate tether or coupling 40. The first coupling 60 and the second coupling 52 of the displacement multiplier 44 are longitudinally spaced relative to a central, longitudinal reference axis 99 along which the displacement multiplier 44 at least generally extends. Moreover, the first coupling 60 and the second coupling 52 are disposed along this axis 99 as well.

Lateral movement of the movable electrodes 72a–d of the actuator 64 exerts an input force on the displacement multiplier 44 at the first coupling 60 to cause at least a lateral movement thereof (and which may also cause the first coupling 60 to flex as well), which in turn causes the various beams 48 of the displacement multiplier 44 to pivot relative to the substrate 8 about the four anchor locations 50 at least generally within the lateral dimension and/or relative to other beams 48, which in turn moves the second coupling 52 of the displacement multiplier 44 in the lateral dimension. In the illustrated embodiment, the amount of lateral movement of the second coupling 52 of the displacement multiplier 44 is greater than the amount of lateral movement of the first coupling 60 of the displacement multiplier 44 (e.g., amplification) for any given amount of lateral movement of the actuator 64.

The elevator 20 has a base 21 that is movably interconnected with the substrate 8, as well as a free end or apex 22 that is movable at least generally away from and towards the substrate 8. The elevator 20 is in the form of an A-frame in the illustrated embodiment and is effectively a lever arm of sorts. More specifically, the elevator 20 is defined by a pair of elevation members 24a–b. One end of each elevation member 24 is interconnected with the substrate 8 by an anchor 28 and an interconnect 32 that is more a pliable or flexible (or stated another way, less rigid) than its corresponding elevation member 24. The interconnects 32 may then be characterized as a compliant member, flexure, or the like. The "pivotally" connected end of the elevator 20 is the base 21. The opposite end of the elevator 20, namely the apex 22, is free to move at least generally away from/toward the substrate 8. That is, the apex 22 of the elevator 20 is not directly attached to the substrate 8 and is thereby able to move at least generally away from/toward the substrate 8 by a pivoting action at least generally about an axis that extends through the anchors 28a–b at the base 21 of the elevator 20 to provide the desired positioning function for the assembly 4. In the illustrated embodiment, the tether 40 is interconnected with a beam 36 that extends between and structurally interconnects the pair of elevation members 24. The beam 36 may be disposed anywhere between the base 21 and the apex 22 of the elevator 20. In fact, any way of interconnecting the tether 40 with the elevator 20 may be utilized.

Figure 1B:
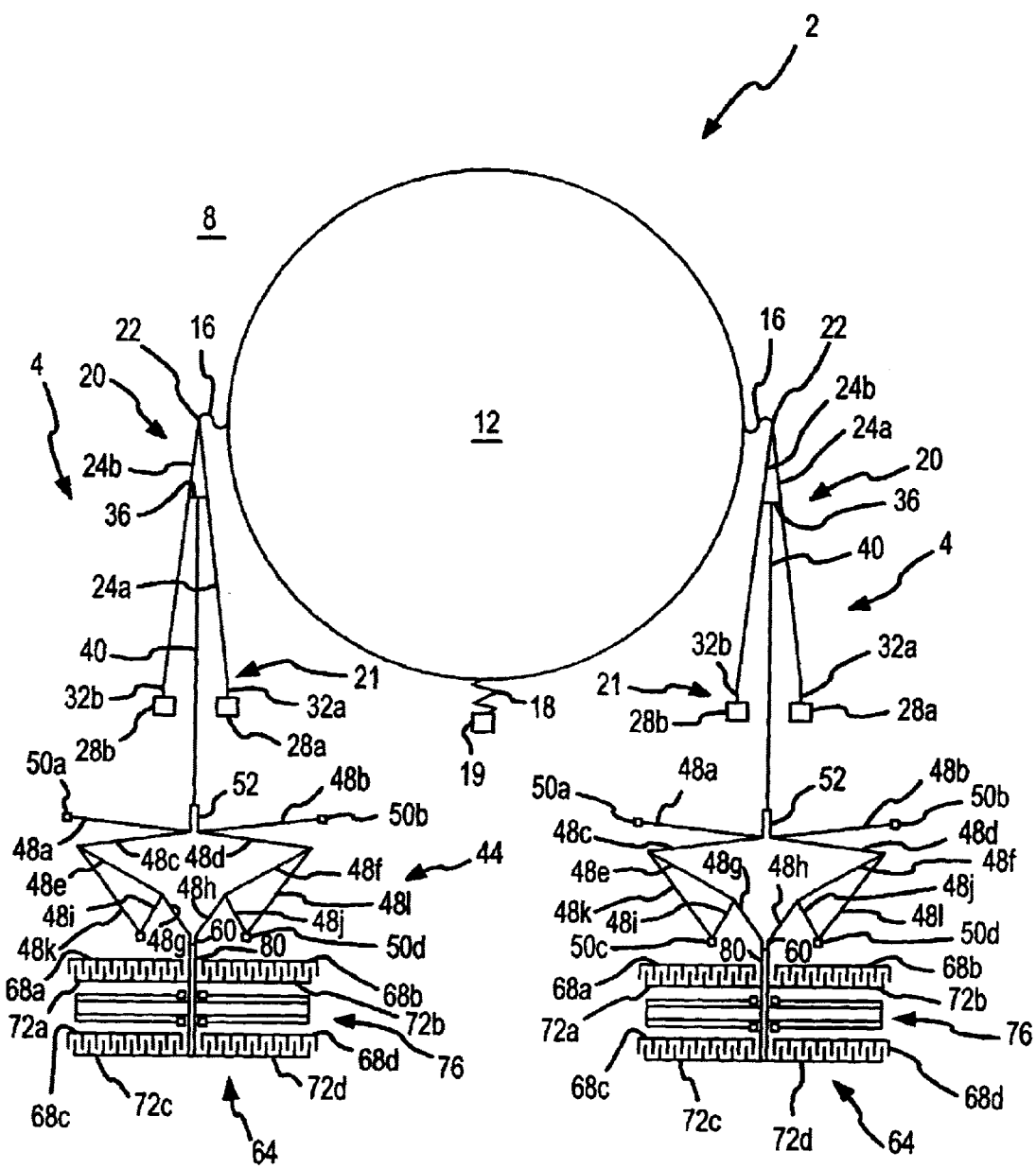
FIG. 1B is a plan view of a microelectromechanical optical system that utilizes a pair of the positioning assemblies illustrated in FIG. 1A.

One embodiment of a microelectromechanical system 2 that utilizes the above-described positioning assembly 4 is illustrated in FIG. 1B. The microelectromechanical system 2 includes a pair of positioning assemblies 4 for moving a mirror 12 at least generally away from/toward the substrate 8. Any appropriate number of positioning assemblies 4 may be utilized to achieve a desired movement of the mirror 12 relative to the substrate 8 (including using only a single positioning assembly 4 or multiple positioning assemblies 4), and any appropriate way of interconnecting the positioning assemblies 4 with the mirror 12 may be utilized as well so long as the point of interconnection is spaced from the base 21 of the elevator (or stated another way such that the point of interconnection is at a location on the elevator 20 that is able to move at least generally away from/toward the substrate 8 during a lateral movement of the corresponding actuator 64 so as to move the mirror 12 at least generally away from/toward the substrate 8). In the illustrated embodiment, each elevator 20 is interconnected with the mirror 12 by a mirror interconnect 16. Any appropriate way of moving the mirror 12 relative to the substrate 8 may be utilized. In the illustrated embodiment, the mirror 12 is also pivotally connected with the substrate 8 by a mirror interconnect 18 at an anchor location 19. Other ways of pivotally interconnecting the mirror 12 with the substrate 8 could be utilized to achieve a different type of motion of the mirror 12 relative to the substrate 8. Moreover, the entirety of the interconnection of the mirror 12 with the substrate 8 may be provided through the positioning assembly(ies) 4.

Summarizing the operation of the microelectromechanical system 2, because each elevator 20 is anchored to the substrate 8 at its base 21, when the associated tether 40 is moved laterally by a lateral movement of the associated actuator 64 in one direction and a resultant lateral movement of both the first and second couplings 60, 52 of the associated displacement multiplier 44, the apex 22 of the associated elevator 20 is pivoted at least generally away from the substrate 8 at least generally through an arc to apply an at least generally upwardly-directed force to the mirror 12 at a location where the mirror 12 is attached to each such elevator 20. In essence, the elevators 20 act as lever arms to lift the mirror 12 (or at least a portion thereof) at least generally away from the substrate 8. Similarly, when the associated tether 40 is moved laterally by a lateral movement of the associated actuator 64 in a different direction (e.g., opposite to the first noted instance) and a resultant lateral movement of both the first and second couplings 60, 52 of the associated displacement multiplier 44, the apex 22 of the associated elevator 20 is pivoted at least generally toward the substrate 8 to apply an at least generally downwardly-directed force to the mirror 12 at a location where the mirror 12 is attached to the elevator 20. As such, increasing the length of the lever arms (elevators 20) increases the amount of vertical displacement of the mirror 12 relative to the substrate 8 for a given angular displacement of the lever arms. Since the mirror 12 is also pivotally interconnected with the substrate 8 by the mirror interconnect 18 at the anchor location 19, the mirror 12 also pivots relative to the substrate 8 as a result of any force applied to the mirror 12 by the pivoting elevators 20. Different types of relative movement between the mirror 12 and the substrate 8 may be realized by how/where each elevator 20 is interconnected with the mirror 12, how/where (including if at all) the mirror 12 is interconnected with the substrate 8, or both. Different types of movement of the mirror 12 relative to the substrate 8 also may be realized by the types of control signals provided to each of the actuators 64 and/or the direction of movement of each of the actuators 64. For instance equal or unequal control signals may be sent to the pair of actuators 64 associated with the pair of elevators 20 and will affect how the mirror 12 moves relative to the substrate 8. Moreover, one elevator 20 may be moved at least generally away from the substrate 8, while another elevator 20 may be moved at least generally toward the substrate 8.

The displacement multiplier 44 is exposed to non-collinear forces by the pivoting of its corresponding elevator 20 relative to the substrate 8, which in turn is achieved by a lateral movement of the actuator 64 in the relevant direction. That is, the resultant force that is exerted on the displacement multiplier 44 at its first coupling 52 is not collinear with the resultant force that is exerted on the displacement multiplier 44 at its second coupling 60. Exposure of the displacement multiplier 44 to such non-collinear forces may adversely affect the operation of microelectromechanical system 2 in one or more respects. For instance, such non-collinear forces may result in an undesired contact or rubbing between different components of the microelectromechanical system 2 (e.g., between the displacement multiplier 44 and an underlying structure, such as the substrate 8). Such non-collinear forces may also have an adverse effect on the motion of the corresponding actuator 64 (e.g., exposing the actuator 64 to a binding-like force). Finally, such non-collinear forces may adversely affect the ability to control one or more microstructures of the microelectromechanical system 2 to the desired degree and/or in the desired manner. Various general configurations of microelectromechanical systems that include/generate non-collinear forces will now be described, followed by various ways in which the existence of such non-collinear forces may be addressed in a microelectromechanical system so as to at least reduce the effects of these non-collinear forces on one or more aspects of the corresponding microelectromechanical system.

Figure 1C:
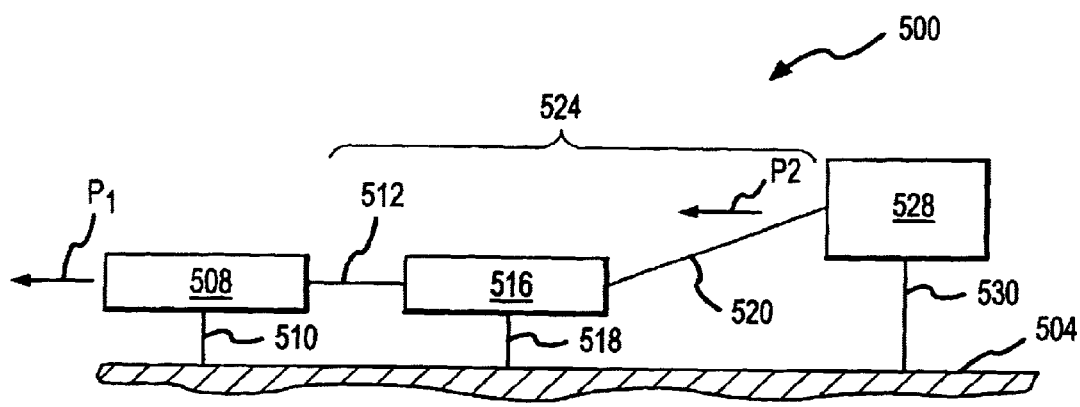
FIG. 1C is a schematic, side view of one embodiment of a microelectromechanical system having a pair of load microstructures and a coupling assembly microstructure that compensates for non-collinear forces being exerted on the coupling assembly microstructure.

FIG. 1C illustrates one embodiment of a microelectromechanical system 500 that is fabricated using an appropriate substrate 504 and that compensates for the existence of non-collinear forces in a desired manner. The microelectromechanical system 500 includes a first load microstructure 508 that is movably interconnected with the substrate 504 in any appropriate manner by a connection 510 for movement along any appropriate path $P_1$, in any appropriate manner (e.g., linear, arcuate), and in any appropriate orientation relative to the substrate 504. A second load microstructure 528 is disposed at a different elevation in the microelectromechanical system 500 than the first load microstructure 508 (e.g., the distance between the first load microstructure 508 and the substrate 504 is different than the distance between the second load microstructure 528 and the substrate 504). The second load microstructure 528 is also movably interconnected with the substrate 504 in any appropriate manner by a connection 530 for movement along any appropriate path $P_2$, in any appropriate manner (e.g., linear, arcuate), and in any appropriate orientation relative to the substrate 504. Movement of the second load microstructure 528 may be in response to an actuated movement of the first load microstructure 508, or vice versa. Both the first load microstructure 508 and the second load microstructure 528 could be actuated for movement relative to the substrate 504 as well. How/why the first load microstructure 508 and the second load microstructure 528 move relative to the substrate 504 is not of particular significance—only that the first load microstructure 508 and second load microstructure 528 at least at some point in time move along non-collinear paths so as to exert non-collinear forces on an interconnecting structure therebetween.

Figure 1D:
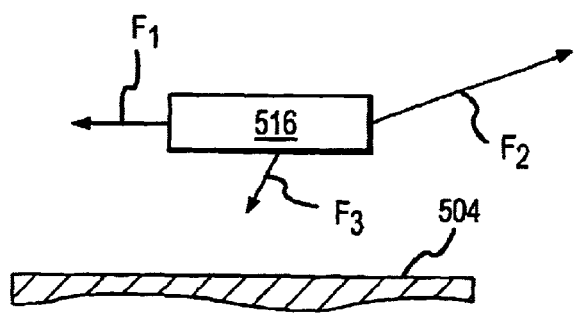
FIG. 1D is a schematic of representative forces that may be exerted on a force isolator microstructure of the coupling assembly microstructure of FIG. 1C.

Extending between and interconnecting the first load microstructure 508 and the second load microstructure 528 is a coupling assembly microstructure 524 that is movably interconnected with the substrate 504 in any appropriate manner by a connection 518. Components of the coupling assembly microstructure 524 include a first coupling microstructure 512, a force isolator microstructure 516, and a second coupling microstructure 520. The first coupling microstructure 512 extends between and interconnects the first load microstructure 508 and the force isolator microstructure 516, while the second coupling microstructure 520 extends between and interconnects the force isolator microstructure 516 and the second load microstructure 528. It should be appreciated that the arrangement illustrated in FIG. 1C exerts non-collinear forces on the force isolator microstructure 516, representative ones of which are illustrated in FIG. 1D. Movement of the first load microstructure 528 relative to the substrate 504 exerts a force $F_1$ on the force isolator microstructure 516, while the second load microstructure exerts a force $F_2$ on the force isolator microstructure 516 that is non-collinear with the force $F_1$. The resultant force on the coupling assembly microstructure 524 may correspond with a force that is directly opposite to the force $F_3$ illustrated in FIG. 1C. The force $F_3$ is what may be characterized as a compensating force that is at least generally directed toward the substrate 504 in the illustrated embodiment and that is in effect generated by the force isolator microstructure 516 so that the net force acting on the coupling assembly microstructure 524 is preferably zero. Stated another way, the coupling assembly microstructure 524 redirects the force $F_2$ such that the same acts upon the first load microstructure 508 along a path that is at least generally collinear with the path $P_1$. Moreover, the microelectromechanical system 500 is configured such that no portion of the coupling assembly microstructure 524 is deflected into engagement with any underlying structure, including the substrate 504, by the existence of the non-collinear forces $F_1$ and $F_2$. That is, the resultant force does not cause any contact or rubbing action between the coupling assembly microstructure 524 and any underlying portion of the microelectromechanical system 500 and including the substrate 504. Representative ways in which one or both of these functions may be realized will be discussed in more detail below in relation to FIGS. 2–16D.

Figure 1E:
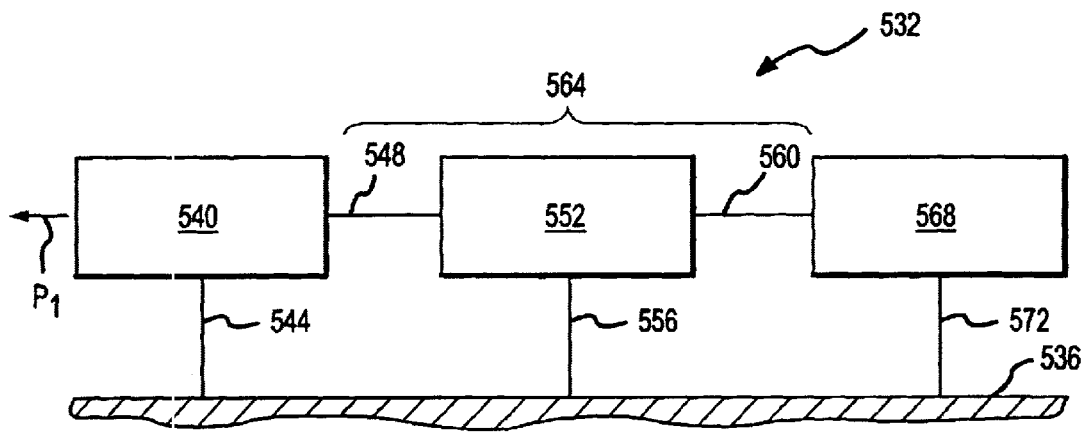
FIG. 1E is a schematic, side view of one embodiment of a microelectromechanical system having a pair of load microstructures and a coupling assembly microstructure that compensates for non-collinear forces being exerted on the coupling assembly microstructure.

FIG. 1E illustrates another embodiment of a microelectromechanical system 532 that is fabricated using a substrate 536, and that compensates for the existence of non-collinear forces in a desired manner. The microelectromechanical system 532 includes a first load microstructure 540 that is movably interconnected with the substrate 536 in any appropriate manner by a connection 544 for movement along any appropriate path $P_1$, in any appropriate manner (e.g., linear, arcuate), and in any appropriate orientation relative to the substrate 536. A second load microstructure 568 is disposed at the same elevation in the microelectromechanical system 532 as the first load microstructure 568 (e.g., the distance between the first load microstructure 540 and the substrate 536 is the same as the distance between the second load microstructure 568 and the substrate 536). The second load microstructure 568 is also movably interconnected with the substrate 536 in any appropriate manner by a connection 572 for movement along any appropriate path $P_2$, in any appropriate manner (e.g., linear, arcuate), and in any appropriate orientation relative to the substrate 536. Movement of the second load microstructure 568 may be in response to an actuated movement of the first load microstructure 540, or vice versa. Both the first load microstructure 540 and the second load microstructure 568 could be actuated for movement relative to the substrate 536 as well. How/why the first load microstructure 540 and the second load microstructure 568 move relative to the substrate 536 is not of particular significance—only that the first load microstructure 540 and second load microstructure 568 at least at some point in time move along non-collinear paths so as to exert non-collinear forces on an interconnecting structure therebetween.

Extending between and interconnecting the first load microstructure 540 and the second load microstructure 568 is a coupling assembly microstructure 564 that is movably interconnected with the substrate 536 in any appropriate manner by a connection 556. Components of the coupling assembly microstructure 564 include a first coupling microstructure 548, a force isolator microstructure 552, and a second coupling microstructure 560. The first coupling microstructure 548 extends between and interconnects the first load microstructure 540 and the force isolator microstructure 552, while the second coupling microstructure 560 extends between and interconnects the force isolator microstructure 552 and the second load microstructure 568.

Figure 1F:
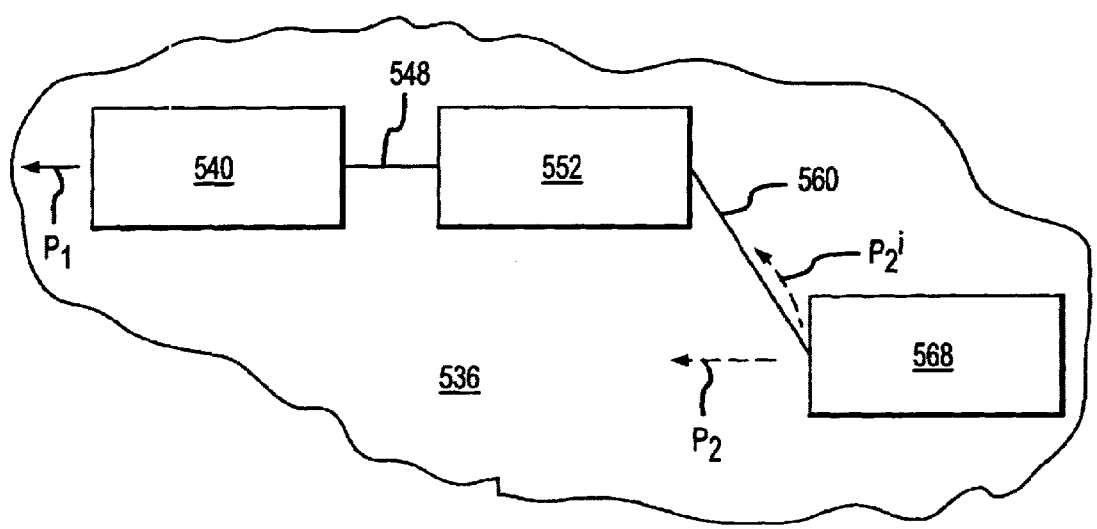
FIG. 1F is a top view of the microelectromechanical system of FIG. 1E.
Figure 1G:
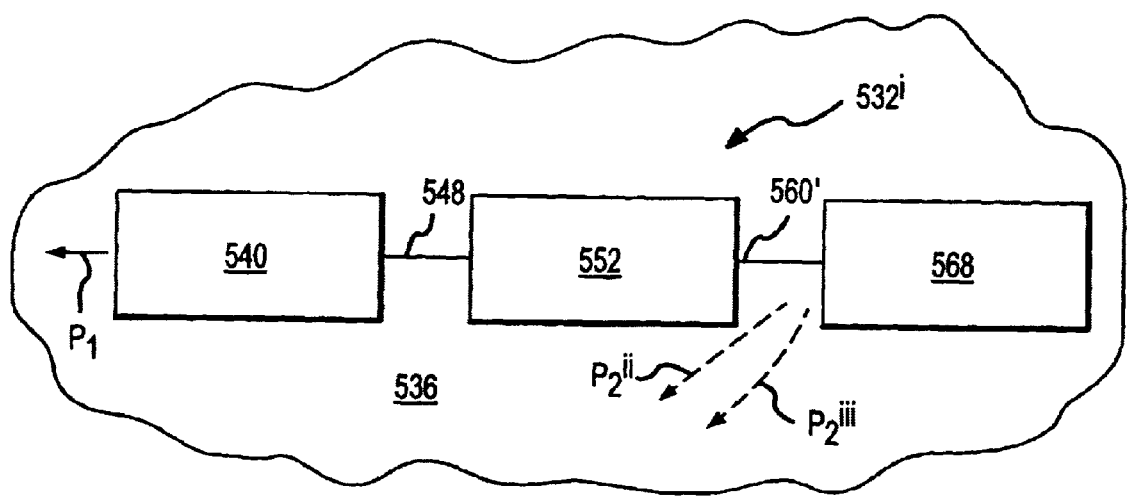
FIG. 1G is a top view of a variation of the microelectromechanical system of FIG. 1E.

The first load microstructure 540 and the second load microstructure 568 may be positioned in any manner on the substrate 536 so as to exert non-collinear forces on the force isolator microstructure 552. One such arrangement is illustrated in FIG. 1F, where the second load microstructure 568 is parallel to but offset from the first load microstructure 540 and the force isolator microstructure 552, and where the second load microstructure 568 moves along any appropriate path that is not collinear with the path $P_1$ of the first load microstructure 540. Representative paths along which the second load microstructure 568 may move in this manner are designated as $P_2$ and $P_2^i$ in FIG. 1F. Another arrangement is illustrated in FIG. 1G, where the first load microstructure 540, the force isolator microstructure 552, and the second load microstructure 568 are at least at some time axially aligned, but where the first microstructure 540 and the second load microstructure 568 move along non-collinear paths relative to the substrate 536. Representative paths along which the second load microstructure 568 may move in this manner are designated as paths $P_2^{ii}$ and $P_2^{iii}$ in FIG. 1G, while a representative path along which the first load microstructure 540 may move is designated as path $P_1$.

It should be appreciated that the arrangements illustrated in both FIGS. 1F and 1G exert non-collinear forces on the force isolator microstructure 552, and which may expose the coupling assembly microstructure 564 to a resultant force that may be at least generally directed toward the substrate 536. Generally, the coupling assembly microstructure 564 redirects the force exerted on the coupling assembly microstructure 564 by the second load microstructure 568, such that the same acts upon the first load microstructure 540 along a path that is at least generally collinear with its path $P_1$. Moreover, the microelectromechanical system 532 is configured such that no portion of the coupling assembly microstructure 564 is deflected into engagement with any underlying structure of the microelectromechanical system 532, and including substrate 536, by the existence of the non-collinear forces that are exerted on the coupling assembly microstructure 564 by the first load microstructure 540 and the second load microstructure 568. Representative ways in which both of these functions may be realized will be discussed in more detail below in relation to FIGS. 2–16D.

There are two key aspects to compensating for the existence of non-collinear forces in a microelectromechanical system. One is including appropriate structure in the system to redirect a first force that is applied to/exerted on the microelectromechanical system so as to be at least generally collinear with a second force that is applied to/exerted on the microelectromechanical system. This force redirection function may be provided at least in part by the displacement multiplier 44 based upon the nature of a pivotless compliant microstructure. Consider the case of the FIG. 1A configuration where a first force $F_1$ is exerted on the first coupling 60, where a second force $F_2$ is exerted on the second coupling 52, and where the direction or vector of the first force $F_1$ is not collinear with the direction or vector of the second force $F_2$. The displacement multiplier 44 may be configured to redirect the second force $F_2$ so as to be at least generally collinear (thereby including being exactly collinear) with the first force $F_1$ at the first coupling 60, to redirect the first force $F_1$ so as to be at least generally collinear with the second force $F_2$ at the second coupling 52, or both. Any configuration may be utilized for the displacement multiplier 44 that provides this force redirection function in relation to at least one of multiple non-collinear forces.

Another key aspect to providing compensation for the existence of non-collinear forces in a microelectromechanical system is to configure at least part of the microelectromechanical system that is exposed to non-collinear forces in such a manner that it does not deflect toward and contact with or rub against any underlying portion of the microelectromechanical system, and including the substrate. Consider again the configuration of the positioning assembly 4 that is presented in FIG. 1A. Here the tether 40 is attached at one end to the output structure or second coupling 52 of the displacement multiplier 44. The opposite end of the tether 40 is attached to the elevator 20. When the actuator 64 moves the input structure or first coupling 60 of the displacement multiplier 44 at least generally toward the elevator 20, the free end or apex 22 of the elevator 20 moves at least generally away from the substrate 8. Since the second coupling 52 of the displacement multiplier 44 is interconnected with a portion of the elevator 20 that is able to move at least generally away from the substrate 8 under these conditions, this movement of the elevator 20 exerts a vertical force component on the second coupling 52 of the displacement multiplier 44. Because the second coupling 52 has at some degree of stiffness, this vertical force component results in a torque being applied to the displacement multiplier 44 at least generally about an axis that passes through what may be characterized as nodes 49a and 49b of the displacement multiplier 44. Node 49a is at least generally that area where the beams 48a and 48c of the displacement multiplier 44 intersect. Node 49b is at least generally that area where the beams 48b and 48d of the displacement multiplier 44 intersect.

In the configuration utilized by the displacement multiplier 44, lateral extremes or nodes 46a and 46b of the displacement multiplier 44 would likely experience the largest amount of downwardly directed motion (i.e., toward the substrate 8) as a result of the application of the above-noted torque on the displacement multiplier 44. The lateral extremes or nodes 46a, 46b are those portions of the displacement multiplier $44^i$ that are disposed furthest from the central, longitudinal reference axis 99. In the event that the second coupling 52 is of a sufficient stiffness, the nodes 46a and/or 46b will contact the substrate 8 due to the above-noted torque. In this regard, when the second coupling 52 is fabricated by surface micromachining so as to have multiple, vertically spaced layers that are anchored to each other at an appropriate number of locations, the second coupling 52 will likely be sufficiently stiff that the noted contact will occur. Any such contact is not desirable for one or more applications that may utilize the positioning assembly 4.

The embodiments of FIGS. 2–7 generally address the forces that are exerted on the displacement multiplier by a movement of the apex 22 of the elevator 20 relative to the substrate 8. Generally, each of these embodiments provide an option for changing how a displacement multiplier deforms when a force of the above-noted type is exerted thereon by the tether 40, such that no portion of the displacement multiplier deflects into contact with the underlying substrate. In the case of the embodiment of FIG. 3, the magnitude of the torque that is exerted on the displacement multiplier $44^{ii}$ as a result of the transmission of a vertical force component to the displacement multiplier $44^{ii}$ by the tether 40 is reduced by having the tether 40 attach to a less rigid structure of the displacement multiplier $44^{ii}$ than in the case of the displacement multiplier 44 of FIG. 1A. In the case of the embodiments of FIGS. 4–6, a counteracting or opposing torque is actually generated that reduces the total torque that is exerted on the corresponding displacement multiplier. In both scenarios, the reduction in the amount of torque that is exerted on a displacement multiplier by the various configurations to be discussed in turn reduces the amount that the displacement multiplier will deflect toward the underlying substrate.

Figure 2:
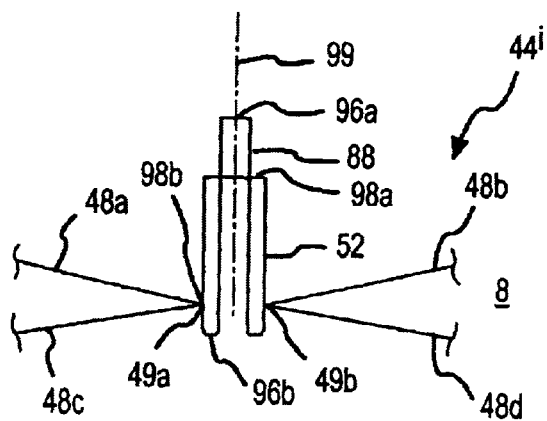
FIG. 2 is a plan view of one embodiment of a relief structure on a displacement multiplier that addresses downward deflection of the displacement multiplier when exposed to non-collinear forces.

FIG. 2 illustrates one embodiment for providing non-collinear force compensation in a microelectromechanical system, including without limitation in terms of reducing the amount of downward deflection of the displacement multiplier 44 when exposed to non-collinear forces. The "superscript" in relation to the displacement multiplier $44^i$ of FIG. 2 indicates that there is at least one difference from the displacement multiplier 44 of FIGS. 1A–B, principally in relation to how the tether 40 interfaces with the displacement multiplier 44, versus how it would interface with the displacement multiplier $44^i$. Corresponding components of the displacement multiplier $44^i$ and the displacement multiplier 44 are identified by common reference numerals.

The displacement multiplier $44^i$ of FIG. 2 includes a relief structure 88 that reduces the amount of deflection of the displacement multiplier $44^i$ toward the underlying substrate 8 when the displacement multiplier $44^i$ is exposed to non-collinear forces (including when a force having a vertical force component is exerted on the relief structure 88). This relief structure 88 provides for interconnection of the tether 40 with the displacement multiplier $44^i$. The first coupling 60 again is interconnected with the actuator 64. Movement of the actuator 64 exerts a force on the first coupling 60 that is not collinear with the force that is exerted on the relief structure 88 by the elevator 20 through the tether 40 as a result of the movement of the actuator 64. Generally, the relief structure 88 may be of any configuration that connects a load with the displacement multiplier $44^i$ in a way such that no portion of the displacement multiplier $44^i$ deflects an amount so as to contact with or rub against the substrate 8 during normal operation of the corresponding microelectromechanical system, and that itself will not deflect into contact with or rub against the substrate 8 during normal operation of the corresponding microelectromechanical system.

The relief structure 88 includes a distal end 96a and a proximal end 96b. The second coupling 52 is illustrated in FIG. 2 as including a distal end 98a and a proximal end 98b. The distal end 96a of the relief structure 88 extends beyond the distal end 98a of the second coupling 52. Similarly, the proximal end 96b of the relief structure 88 extends beyond the proximal end 98b of the second coupling 52. The relief structure 88 interconnects with the second coupling 52, the intersection of the beams 48a, 48c (node 49a), and the intersection of beams 48b and 48d (node 49b) of the displacement multiplier $44^i$ at an intermediate location between its distal end 96a and proximal end 96b.

The relief structure 88 is disposed at a different elevation than the second coupling 52, or stated another way is disposed a different distance from the substrate 8 that is used to fabricate the displacement multiplier $44^i$. In one embodiment, the relief structure 88 is formed from a single structural layer in a surface micromachined system, while the second coupling 52 and the beams 48 are vertically spaced from relief structure 88 in the direction of the substrate 8 (i.e., closer to the substrate 8) and are formed from multiple, vertically-spaced structural layers that are appropriately pinned or anchored to each other (discussed in more detail below). The relief structure 88 also may be characterized as being more flexible or pliable (i.e., less rigid) than the second coupling 52 about an axis that extends between the nodes 49a, 49b or one that is parallel thereto.

The tether 40 or other appropriate coupling structure attaches to the distal end 96a of the relief structure 88 to interconnect the displacement multiplier $44^i$ with the elevator 20 or any other appropriate load. The relief structure 88 includes structure on each side of the central, longitudinal reference axis 99 of the displacement multiplier $44^i$ (preferably symmetrically relative thereto), whereas the tether 40 is disposed collinear with this axis 99. Because the lateral movement of the tether 40 (via the corresponding actuator 64 and the displacement multiplier $44^i$) in turn moves the apex 22 of the elevator 20 relative to the substrate 8, the force exerted on the first coupling 60 of the displacement multiplier $44^i$ by a movement of the actuator 64 is not collinear with a force that is exerted on the relief structure 88 by the tether 40. The force that is exerted on the relief structure 88 will have a vertical force component that is transmitted to the relief structure 88 through the tether 40. This in turn exerts a torque on the displacement multiplier $44^i$ that is directed at least generally about an axis that extends through the nodes 49a and 49b in accordance with the foregoing.

Generally, the configuration of the relief structure 88 and how the same is interconnected with the remainder of the displacement multiplier $44^i$ reduces the magnitude of the torque that is exerted on the displacement multiplier $44^i$ at least generally about an axis that extends through the nodes 49a, 49b as a result of the existence of the above-noted vertical force component. As a result of the relief structure 88 reducing the magnitude of the torque that is exerted on the displacement multiplier $44^i$ at least generally about an axis that extends through the nodes 49a, 49b, the potential for undesired contact between the displacement multiplier $44^i$ and the substrate 8 is similarly reduced. Reducing the torque by utilizing the relief structure 88 reduces the amount of deflection of at least a portion of the displacement multiplier $44^i$ toward the substrate 8.

Figure 3:
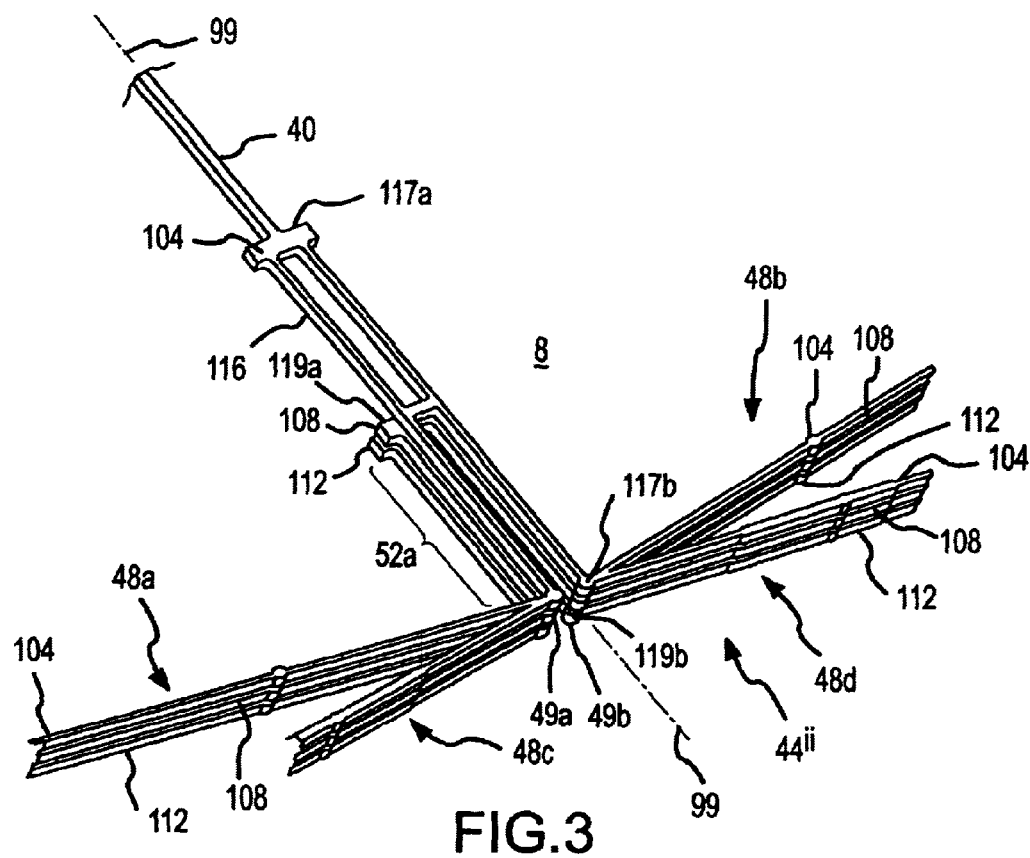
FIG. 3 is a perspective view of another embodiment of a relief structure on a displacement multiplier that addresses downward deflection of the displacement multiplier when exposed to non-collinear forces.

FIG. 3 illustrates another embodiment for providing non-collinear force compensation in a microelectromechanical system, including without limitation in terms of reducing the amount of downward deflection of the displacement multiplier 44 when exposed to non-collinear forces. The "superscript" in relation to the displacement multiplier $44^{ii}$ of FIG. 3 indicates that there is at least one difference from the displacement multiplier 44 of FIGS. 1A–B, principally in relation to how the tether 40 interfaces with the displacement multiplier 44, versus how it interfaces with the displacement multiplier $44^{ii}$. Corresponding components of the displacement multiplier $44^{ii}$ and the displacement multiplier 44 are identified by common reference numerals.

The displacement multiplier $44^{ii}$ of FIG. 3 includes a relief structure 116 that reduces the amount of deflection of the displacement multiplier $44^{ii}$ toward the underlying substrate 8 when exposed to non-collinear forces (for instance, when a force having a vertical force component is exerted on the relief structure 116). This relief structure 116 provides for interconnection of the tether 40 with the displacement multiplier $44^{ii}$. The first coupling 60 again is interconnected with the actuator 64. The actuator 64 exerts a force on the first coupling 60 that is not collinear with the force that exerted on the relief structure 116 by the elevator 20 through the tether 40 as a result of the movement of the actuator 64. Generally, the relief structure 116 may be of any configuration that connects a load with the displacement multiplier $44^{ii}$ in a way such that no portion of the displacement multiplier $44^{ii}$ deflects an amount so as to contact with or rub against the substrate 8 during normal operation of the corresponding microelectromechanical system, and itself will not deflect into contact with or rub against the substrate 8 during normal operation of the corresponding microelectromechanical system.

The relief structure 116 includes a distal end 117a and a proximal end 117b. The second coupling 52a includes a distal end 119a and a proximal end 119b. The distal end 117a of the relief structure 116 extends beyond the distal end 119a of the second coupling 52a, similar to the FIG. 2 embodiment. However, unlike the embodiment of FIG. 2, the proximal end 117b of the relief structure 116 terminates at the same longitudinal position relative to the central, longitudinal reference axis 99 of the displacement multiplier $44^{ii}$ as the proximal end 119b of the second coupling 52a (also corresponding with the longitudinal position of the nodes 49a, 49b).

The relief structure 116 is disposed at a higher elevation than the second coupling 52a. In the illustrated embodiment, the relief structure 116 is formed from a single structural layer 104 (which is also used to form the tether 40) by surface micromachining, while the second coupling 52a is vertically spaced from the relief structure 116 (in the direction of the substrate 8) and is formed from two vertically spaced structural layers 108, 112 that are appropriately pinned or anchored to each other by surface micromachining. The various beams 48 of the displacement multiplier $44^{ii}$ are formed from each of these multiple structural layers 104, 108, and 112 as well, and are anchored or pinned to each other at multiple, appropriate locations. The principles of non-collinear compensation presented by the FIG. 3 embodiment are not limited to the number of structural layers disclosed therein.

The relief structure 116 is interconnected with the tether 40 in the illustrated embodiment of FIG. 3. The relief structure 116 is disposed on each side of the central, longitudinal reference axis 99 of the displacement multiplier $44^{ii}$ (preferably symmetrically relative thereto), whereas the tether 40 is disposed collinear with this axis 44. Because the lateral movement of the tether 40 (via the actuator 64 and the displacement multiplier $44^{ii}$) in turn moves the apex 22 of the elevator 20 relative to the substrate 8, the force exerted on the first coupling 60 of the displacement multiplier $44^{ii}$ by a movement of the actuator 64 is not collinear with a force that is exerted on the relief structure 116 by the tether 40. That is, a vertical force component is transmitted to the relief structure 116 through the tether 40. This in turn exerts at least a vertical force component on nodes 49a and 49b of the displacement multiplier $44^{ii}$. This in turn exerts a torque on the displacement multiplier $44^{ii}$ that is directed at least generally about an axis that extends through the nodes 49a and 49b in accordance with the foregoing.

The configuration of the relief structure 116 and how the relief structure 116 is interconnected with the remainder of the displacement multiplier $44^{ii}$ reduces the magnitude of the torque that is exerted on the displacement multiplier $44^{ii}$ at least generally about an axis that extends through the nodes 49a, 49b as a result of the existence of the above-noted vertical force component. Specifically, the relief structure 116 is of a stiffness such that the displacement multiplier $44^{ii}$ will not deflect into contact with the underlying substrate 8 during normal operation of a microelectromechanical system that includes the displacement multiplier $44^{ii}$. That is, as a result of reducing the magnitude of the torque that is exerted on the displacement multiplier $44^{ii}$ at least generally about an axis that extends through the nodes 49a, 49b, the potential for undesired contact between the displacement multiplier $44^{ii}$ and the substrate 8 is similarly reduced. Reducing the torque by utilizing the relief structure 116 reduces the amount of deflection of at least a portion of the displacement multiplier $44^{iii}$ toward the substrate 8.

Figure 4:
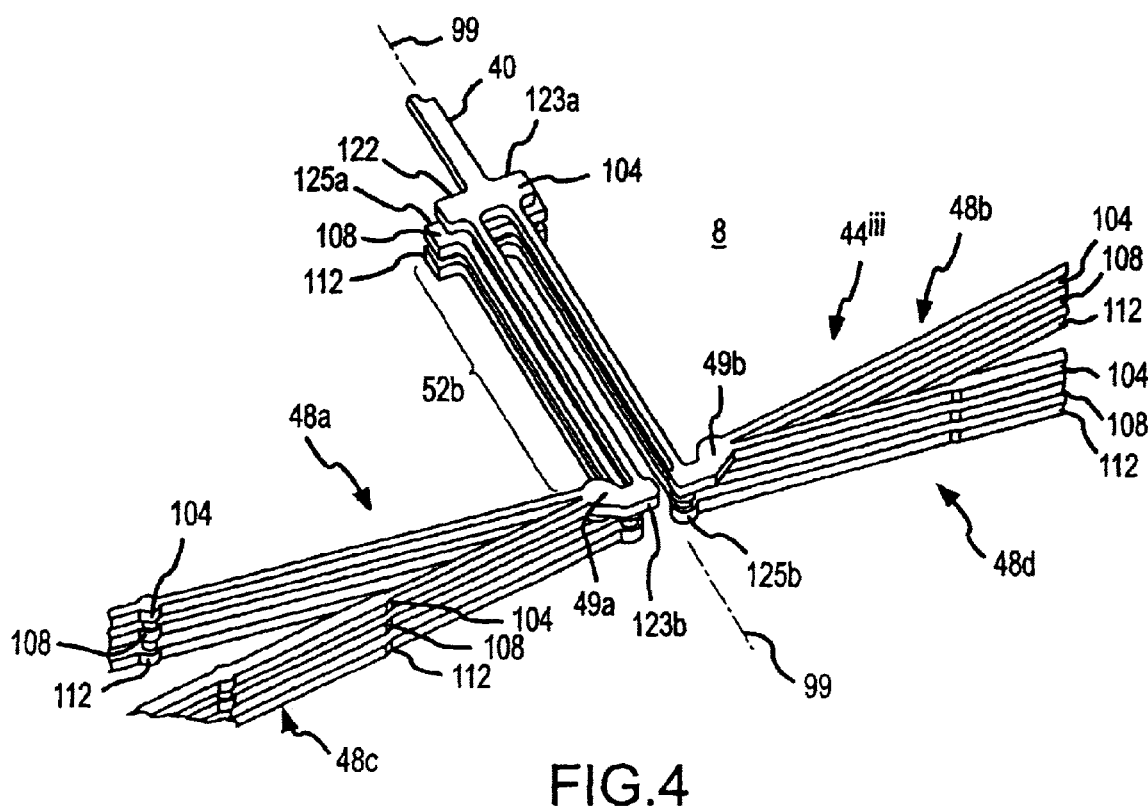
FIG. 4 is a perspective view of another embodiment of a relief structure on a displacement multiplier that addresses downward deflection of the displacement multiplier when exposed to non-collinear forces.

FIG. 4 illustrates another embodiment for providing non-collinear force compensation in a microelectromechanical system, including without limitation in terms of reducing the amount of downward deflection of the displacement multiplier 44 when exposed to non-collinear forces. The "superscript" in relation to the displacement multiplier $44^{iii}$ of FIG. 4 indicates that there is at least one difference from the displacement multiplier 44 of FIGS. 1A–B, principally in relation to how the tether 40 interfaces with the displacement multiplier 44, versus how it interfaces with the displacement multiplier $44^{iii}$. Corresponding components of the displacement multiplier $44^{iii}$ and the displacement multiplier 44 are identified by common reference numerals.

The displacement multiplier $44^{iii}$ of FIG. 4 includes a relief structure 122 that reduces the amount of deflection of the displacement multiplier $44^{iii}$ toward the underlying substrate 8 when the displacement multiplier $44^{iii}$ is exposed to non-collinear forces (for instance, when a force having a vertical force component is exerted on the relief structure 122). This relief structure 122 provides for interconnection of the tether 40 with the displacement multiplier $44^{iii}$. The first coupling 60 again is interconnected with the actuator 64. Movement of the actuator exerts a force on the first coupling 60 that is not collinear with the force that is exerted on the relief structure 122 by the elevator 20 through the tether 40 as a result of the movement of the actuator 64. Generally, the relief structure 122 may be of any configuration that connects a load with the displacement multiplier $44^{iii}$ in a way such that no portion of the displacement multiplier $44^{iii}$ deflects an amount so as to contact with or rub against the substrate 8 during normal operation of the corresponding microelectromechanical system, and itself will not deflect into contact with or rub against the substrate 8 during normal operation of the corresponding microelectromechanical system.

The relief structure 122 includes a distal end 123a and a proximal end 123b. The second coupling 52b includes a distal end 125a and a proximal end 125b. The distal end 123a of the relief structure 122 is disposed at the same position along the central, longitudinal reference axis 99 of the displacement multiplier $44^{iii}$ as the distal end 125a of the second coupling 52b. However, the proximal end 123b of the relief structure 122 extends slightly beyond the proximal end 125b of the second coupling 52b in the longitudinal direction. In one embodiment, the proximal end 123b of the relief structure 122 and the proximal end 125b of the second coupling 52b are separated by a distance of about 5 microns that is measured along the central, longitudinal reference axis 99 of the displacement multiplier $44^{iii}$.

The relief structure 122 is disposed at a higher elevation than the second coupling 52b. In the illustrated embodiment, the relief structure 122 is formed from only the structural layer 104 (which is also used to form the tether 40) by surface micromachining, while the second coupling 52b is vertically spaced from the relief structure 122 (in the direction of the substrate 8) and is formed from two vertically spaced structural layers 108, 112 that are appropriately pinned or anchored to each other by surface micromachining. The various beams 48 of the displacement multiplier 44$^{iii}$ are formed from each of these multiple structural layers 104, 108, and 112 as well, and are anchored or pinned to each other at multiple, appropriate locations. The principles of non-collinear force compensation presented by the FIG. 4 embodiment are not limited to the number of structural layers disclosed therein.

The relief structure 122 is interconnected with the tether 40 in the illustrated embodiment of FIG. 4. The relief structure 122 is disposed on each side of the central, longitudinal reference axis 99 of the displacement multiplier 44$^{iii}$ (preferably symmetrically relative thereto), whereas the tether 40 is disposed collinear with this axis 99. Because the lateral movement of the tether 40 (via the actuator(s) 64 and the displacement multiplier 44$^{iii}$) in turn moves the apex 22 of the elevator 20 relative to the substrate 8, the force exerted on the first coupling 60 of the displacement multiplier 44$^{ii}$ by a movement of the actuator 64 is not collinear with a force that is exerted on the relief structure 122 by the tether 40. That is, a vertical force component is transmitted to the relief structure 122 through the tether 40. This in turn exerts a torque on the displacement multiplier 44$^{ii}$ that is directed at least generally about an axis that extends through the nodes 49a and 49b in accordance with the foregoing.

Generally, the configuration of the relief structure 122 and how the relief structure 122 is interconnected with the remainder of the displacement multiplier 44$^{iii}$ reduces the magnitude of the torque that is exerted on the displacement multiplier 44$^{iii}$ at least generally about an axis that extends through the nodes 49a, 49b as a result of the existence of the above-noted vertical force component. The application of a vertical force component on the distal end 123a of the relief structure 122 produces both a torque and a force at the proximal end 123b of the relief structure 122 because the relief structure 122 does have some level of stiffness associated therewith. However, the vertical force component of the force acting at the proximal end 123b results in a torque of an opposite sign than that produced by the application of a vertical force component to the distal end 123a of the relief structure 122. That is, the torque that results from the application of the vertical force component to the proximal end 123b opposes the torque that results from the application of the vertical force component at the distal end 123a. As such, the net torque about an axis that extends between nodes 49a and 49b is desirably reduced. Changing the location of the proximal end 123b relative to an axis that extends through the nodes 49a, 49b will change the magnitude of this counteracting or opposing torque. There may be other ways to generate an opposing torque as well. In any case, as a result of reducing the magnitude of the net torque that is exerted on the displacement multiplier 44$^{iii}$ at least generally about an axis that extends through the nodes 49a, 49b, the potential for undesired contact between the displacement multiplier 44$^{iii}$ and the substrate 8 is similarly reduced. That is, reducing the net torque by utilizing the relief structure 122 reduces the amount of deflection of at least a portion of the displacement multiplier 44$^{iii}$ toward the substrate 8.

Figure 5:
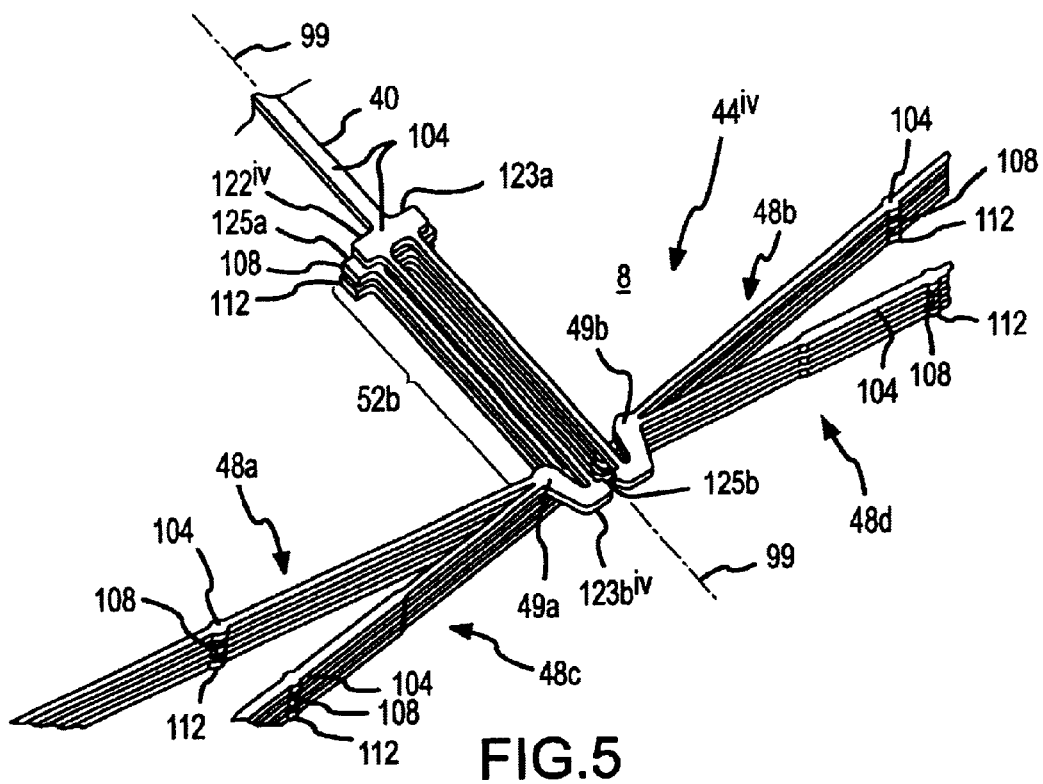
FIG. 5 is a perspective view of another embodiment of a relief structure on a displacement multiplier that addresses downward deflection of the displacement multiplier when exposed to non-collinear forces.

FIG. 5 illustrates another embodiment for providing non-collinear force compensation in a microelectromechanical system, including without limitation in terms of reducing the amount of downward deflection of the displacement multiplier 44 when exposed to non-collinear forces. The configuration of FIG. 5 is similar to that of FIG. 4. The primary difference is that the proximal end 123$^{iv}$ of the relief structure 122$^{iv}$ and the proximal end 125b of the second coupling 52b are separated by a greater distance in the FIG. 5 embodiment than in the FIG. 4 embodiment. In the FIG. 5 embodiment, the proximal end 123b iv of the relief structure 122$^{iv}$ and the proximal end 125b of the second coupling 52b are separated by a distance of at least about 10 microns measured along the central, longitudinal reference axis 99 of the displacement multiplier 44$^{iv}$. Increasing the distance of the proximal end 123b$^{iv}$ from an axis that extends through the nodes 49a, 49b increases the magnitude of the opposing torque in accordance with the foregoing.

Figure 6:
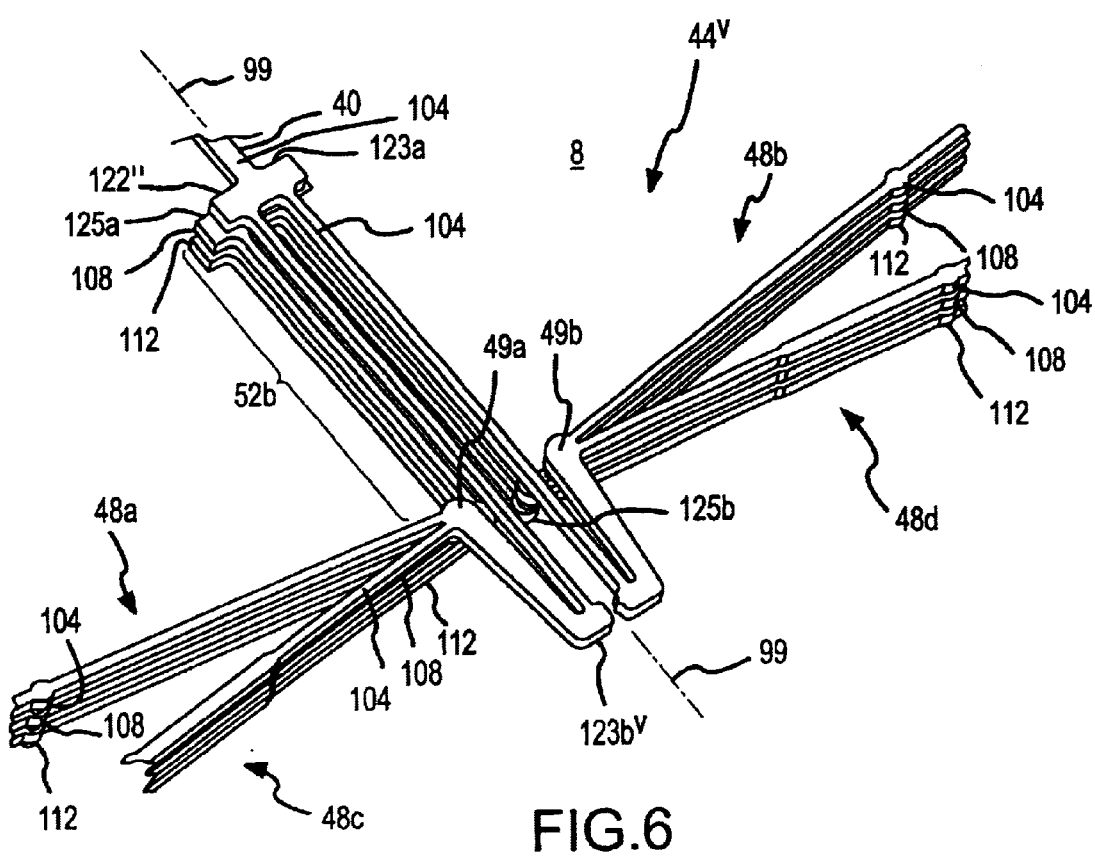
FIG. 6 is a perspective view of another embodiment of a relief structure on a displacement multiplier that addresses downward deflection of the displacement multiplier when exposed to non-collinear forces.

FIG. 6 illustrates another embodiment for providing non-collinear force compensation in a microelectromechanical system, including without limitation in terms of reducing the amount of downward deflection of the displacement multiplier 44 when exposed to non-collinear forces. The configuration of FIG. 6 is similar to the configurations of FIGS. 4–5. The primary difference is that the proximal end 123b$^v$ of the relief structure 122$^v$ and the proximal end 125b of the second coupling 52b are separated by an even greater distance in the FIG. 6 embodiment than in the FIG. 5 embodiment. In the FIG. 6 embodiment, the proximal end 123b$^v$ of the relief structure 122$^v$ and the proximal end 125b of the second coupling 52b are separated by a distance of at least about 30 microns measured along the central, longitudinal reference axis 99 of the displacement multiplier 44$^v$. Increasing the distance of the proximal end 123b$^v$ from an axis that extends through the nodes 49a, 49b increases the magnitude of the opposing torque in accordance with the foregoing.

The embodiments of FIGS. 2–6 are similar in that each utilizes a relief structure having a distal end that is interconnected with the tether 40 and that is interconnected with a remainder of the displacement multiplier such that a reduced net torque is exerted on the displacement multiplier. Various modifications of the configuration of the relief structure and/or the manner of interconnecting the same with the remainder of the displacement multiplier in each of these embodiments may have an effect not only on the magnitude of the torque that is exerted on the corresponding displacement multiplier 44 about an axis that extends through the nodes 49a, 49b, but on how these forces are transmitted to this displacement multiplier 44 as well. Where the relief structure is anchored to the remainder of the displacement multiplier 44, as well as the location of the proximal end of the relief structure relative to nodes 49a, 49b, are but a couple of the factors that may have an effect on how the displacement multiplier 44 responds to the application of vertical force component to its relief structure.

It should also be appreciated that the configurations presented in FIGS. 3–6 are not limited to the particular multi-layered configurations presented in these figures. Although it may be preferable to have the relief structure be axially aligned with the anchor location between the various structural layers of the second coupling at its proximal end, such need not be the case (e.g., these anchor locations may be disposed different distances from the central, longitudinal reference axis 99 of the displacement multiplier 44). Moreover, the embodiments of FIGS. 2–6 are not limited to surface micromachined configurations. What is of primary importance in the configurations of FIGS. 2–6 is the inclusion of a relief structure that desirably modifies the torque and forces delivered to the remainder of the displacement multiplier to reduce the amount that the displacement multiplier deflects toward the underlying substrate. There also may be circumstances where the second coupling 52 may be eliminated altogether from each of the embodiments of FIGS. 2–6. In this case, the tether 40 and the relief structure could have the same thickness, and the relief structure would provide the function of transferring the forces from the tether 40 to both sides of the displacement multiplier 44 (relative to its central, longitudinal reference axis 99 as well).

Figure 7:
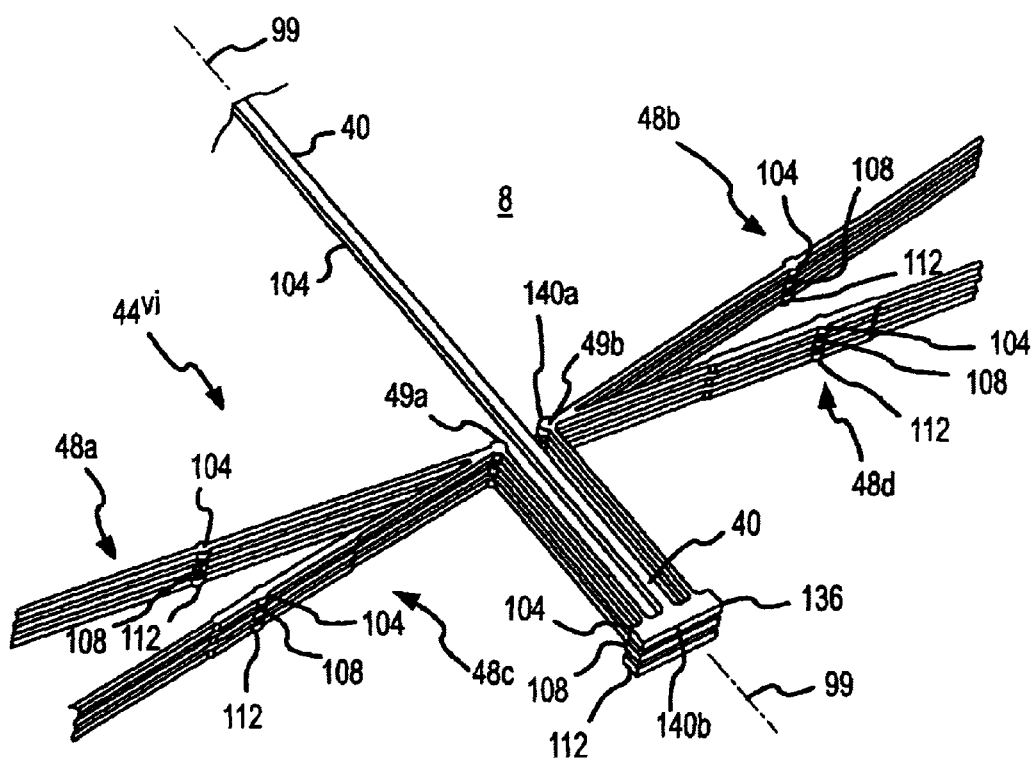
FIG. 7 is a perspective view of another embodiment of a relief structure on a displacement multiplier that addresses downward deflection of the displacement multiplier when exposed to non-collinear forces.

FIG. 7 illustrates another embodiment for providing non-collinear force compensation in a microelectromechanical system, including without limitation in terms of reducing the amount of downward deflection of the displacement multiplier 44 when exposed to non-collinear forces. The "superscript" in relation to the displacement multiplier $44^{vi}$ of FIG. 7 indicates that there is at least one difference from the displacement multiplier 44 of FIGS. 1A–B, principally in relation to how the tether 40 interfaces with the displacement multiplier 44, versus how it interfaces with the displacement multiplier $44^{vi}$. Corresponding components of the displacement multiplier $44^{vi}$ and the displacement multiplier 44 are identified by common reference numerals.

The displacement multiplier $44^{vi}$ of FIG. 7 includes a relief structure 136 that is disposed on the opposite side (longitudinally) of the nodes 49a, 49b than the embodiments of FIGS. 2–6. The relief structure 136 includes a distal end 140a and a proximal end 140b. There are a number of basic differences between the configuration of FIG. 7 and the configurations of FIGS. 2–6. First is that the tether 40 extends along the central, longitudinal reference axis 99 of the displacement multiplier $44^{vi}$ beyond the longitudinal location of the nodes 49a, 49b in the case of the displacement multiplier $44^{vi}$, whereas the end of the tether 40 is spaced from the nodes 49a, 49b in direction of the elevator 20 in the case of the embodiments of FIGS. 2–6. The tether 40 also interconnects with the proximal end 140b of the relief structure 136 in the case of the FIG. 7 embodiment, whereas the tether 40 interconnects with the distal end of the relief structure in each of the embodiments of FIGS. 2–6. Another is that the two sides of the relief structure 136 (one side being disposed on one side of the central, longitudinal reference axis 99 of the displacement multiplier $44^{vi}$ and the other side being disposed on the other side of the axis 99) are not interconnected by a structural cross member at its distal end 140a, unlike the embodiments of FIGS. 2–6. The distal end 140a of the relief structure 136 is also disposed along the central, longitudinal reference axis 99 of the displacement multiplier $44^{vi}$ at least generally at the nodes 49a, 49b. Finally, the relief structure 136 is formed from multiple structural layers (layers 104, 108, and 112 in the illustrated embodiment) that may be pinned or anchored to each other in any appropriate manner. Generally, the configuration of the relief structure 136 and how the relief structure 136 is interconnected with the remainder of the displacement multiplier $44^{vi}$ reduces the magnitude of the torque that is exerted on the displacement multiplier $44^{vi}$ at least generally about an axis that extends through the nodes 49a, 49b as a result of the existence of the above-noted vertical force component.

Figure 8:
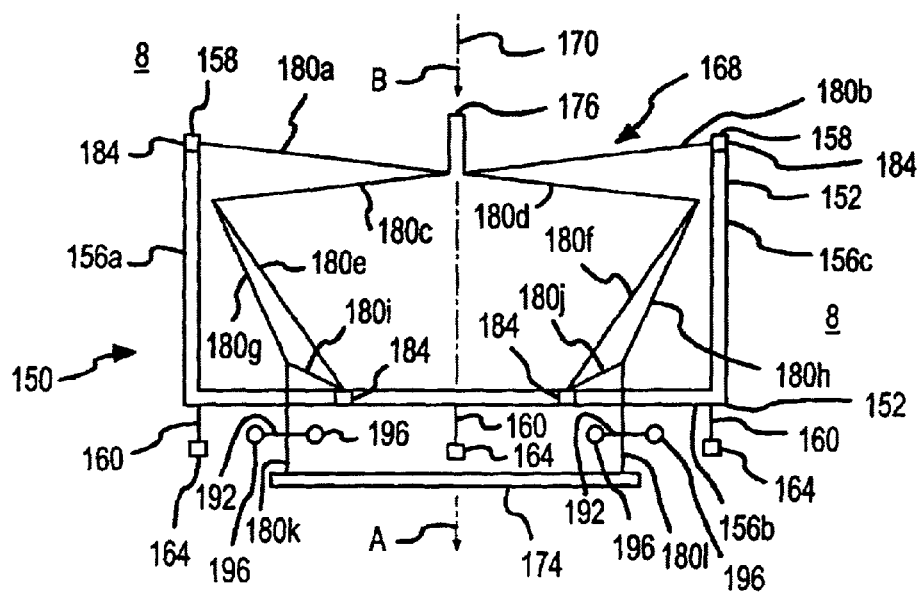
FIG. 8 is a plan view of one embodiment of a displacement multiplier that is mounted on a rigid frame, that in turn is pivotally interconnected with a substrate.

FIG. 8 illustrates another embodiment for providing non-collinear force compensation in a microelectromechanical system, including without limitation in terms of reducing the potential for undesired contact with an underlying portion of the system due to the existence of non-collinear forces.

Generally, the MEM system 150 includes a displacement multiplier 168 that is mounted on (e.g., pinned or anchored) a displacement multiplier frame 152, that in turn is movably interconnected with the substrate 8. In one embodiment, the displacement multiplier frame 152 is a more rigid structure than the displacement multiplier 168, and in another embodiment is sufficiently rigid such that there is no substantial (or intended) flexure of the same when exposed to the types of forces that are contemplated during normal operation of the microelectromechanical system 150. Components of the frame 152 include a pair of frame sections 156a, 156c that are disposed on opposite sides of and preferably equally spaced from a central, longitudinal reference axis 170 of the displacement multiplier 168. A displacement multiplier frame section 156b extends between interconnects the frame sections 156a, 156c at one end thereof, and thereby is disposed at least generally transverse to the central, longitudinal reference axis 170 of the displacement multiplier 168. In the illustrated embodiment, the displacement multiplier frame 152 is at least generally U-shaped. Other configurations may be appropriate. What is of relevance is having at least a portion of a frame that is able to move away from the substrate 8 (e.g., via a pivoting action or the like) when the displacement multiplier 168 mounted thereon is exposed to non-collinear forces (and including where at least one of these forces has a vertical force component).

One way for movably interconnecting the displacement multiplier frame 152 with the substrate 8 is via a plurality of frame flexures or compliant members 160 that extend between the frame section 156b and a plurality of frame anchors 164 that are fixed relative to the substrate 8. These frame flexures 160 are less rigid (e.g., more flexible) than the displacement multiplier frame 152. The frame flexures 160 are the only interconnection between the displacement multiplier frame 152 and the substrate 8. Therefore, distal ends 158 of the displacement multiplier frame 152 are able to move at least generally away from the substrate 8 by a flexing of the frame flexures 160 (e.g., by a pivoting-like action of the displacement multiplier frame 152 about an axis that is at least generally transverse to the central, longitudinal reference axis 170 of the displacement multiplier 168 and that extends through the anchors 164).

The displacement multiplier 168 is defined by a plurality of beams 180 and is interconnected to the displacement multiplier frame 152 at four anchor locations 184. An output coupling 176 of any appropriate configuration is disposed at one end of the displacement multiplier 168 and may be interconnected with an appropriate load (e.g., the tether 40 of the positioning assembly 4 of FIGS. 1A–B), while an input coupling 174 of any appropriate configuration is disposed at the other end of the displacement multiplier 168 and may be interconnected with an appropriate motive source (e.g., the actuator 64 of the positioning assembly 4). Application of a force to the input coupling 174 of the displacement multiplier 168 so as to longitudinally move the input coupling 174 relative to the central, longitudinal reference axis 170 in the direction of the arrow A will cause various portions of the displacement multiplier 168 to pivot in an at least generally predetermined manner, and so as to also longitudinally move the output coupling 176 of the displacement multiplier 168 relative to the central, longitudinal reference axis 170 in the direction of the arrow B.

When the forces exerted on the input coupling 174 and the output coupling 176 are collinear, the various beams 180 of the displacement multiplier 168 will be at least generally disposed within a plane that is at least generally parallel with the substrate 8. The frame 152 will also be disposed at least generally parallel with the substrate 8. However, when the forces exerted on the input coupling 174 and the output coupling 176 are not collinear (e.g., when output coupling 176 of the displacement multiplier 168 is exposed to a vertical force component, such as when the tether 40 moves the apex 22 of the elevator 20 relative to the substrate 8 via a lateral movement of the actuator 64), the distal ends 158 of the displacement multiplier frame 152 will move relative to the substrate 8 to address this condition and reduce the potential for undesired contact between the displacement multiplier 168 and the substrate 8. This again is realized by a pivoting-like action of the frame 152 relative to the substrate 8 and at least generally about an axis that extends through the anchors 164 or one parallel thereto. This then disposes the frame 152 at an angle relative to the substrate 8. Moreover, the plurality of beams 180 of the displacement multiplier 168 will also continue to be at least generally disposed within a common plane, but this common plane will now be disposed at an angle relative to the substrate 8.

In order to reduce the magnitude of the vertical force component that is transmitted to the input coupling 174, and thereby any microstructure that may be interconnected therewith (e.g., the actuator 64), at least one doubly clamped beam 192 is utilized by the microelectromechanical system 150. Stated another way, any such doubly clamped beam 192 at least assists in the redirection of the force that is exerted on the output coupling 176 so as to be at least generally collinear with the force exerted on the input coupling 174. At least one doubly clamped beam 192 is attached to the beams 180k, 180l of the displacement multiplier 168 that are disposed on opposite sides of the central, longitudinal reference axis 170 of the displacement multiplier 168 and that are attached to the input coupling 174 of the displacement multiplier 168. Each doubly clamped beam 192 is appropriately fixed to the respective beam 180k, 180l of the displacement multiplier 168, and further is interconnected with the substrate 8 on both sides of the respective beam 180k, 180l via an anchor 196. As such, it should be appreciated that the inclusion of the doubly clamped beams 192 constrains upward motion of the beams 180k, 180l when the output coupling 176 of the displacement multiplier 168 is exposed to a vertical force component. This then reduces the amount of the vertical force component that is transferred to any microstructure that is interconnected with the input coupling 174 of the displacement multiplier 168 (e.g., the actuator 64). Reducing the amount of any vertical force component that is transferred to the actuator 64 when interconnected with the input coupling 174 of the displacement multiplier 168 is desirable in that the actuator 64 moves laterally relative to the substrate 8, and such a vertical force component may adversely affect one or more aspects of the operation of such an actuator 64.

Figure 9A:
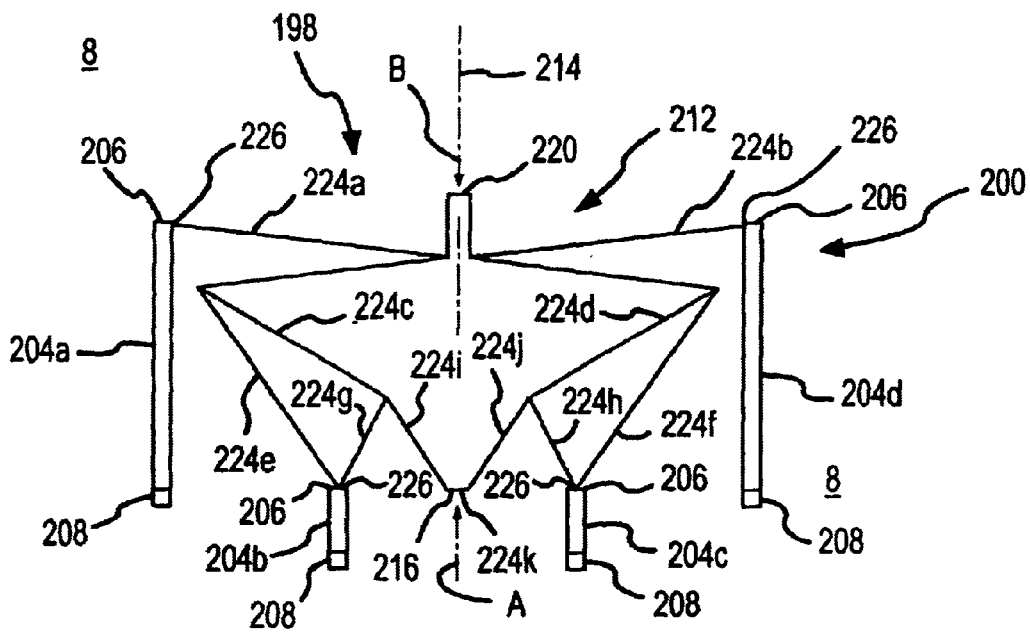
FIG. 9A is a plan view of one embodiment of a displacement multiplier that is mounted on one embodiment of a frame assembly, that in turn is pivotally interconnected with a substrate.

FIG. 9A illustrates another embodiment for providing non-collinear force compensation in a microelectromechanical system, including without limitation in terms of reducing the potential for undesired contact with an underlying portion of the system due to the existence of non-collinear forces. Generally, the microelectromechanical system 198 of FIG. 9A includes a displacement multiplier 212 that is mounted on (e.g., pinned or anchored) a displacement multiplier frame assembly 200, that in turn is movably interconnected with the substrate 8 in any appropriate manner. Components of the frame assembly 200 include a plurality of individual frame sections 204a–d. One end of each frame section 204a–d is interconnected with the substrate 8 by a frame anchor 208, while a distal end 206 of each frame section 204a–d is not attached to the substrate 8 so as to be able to move at least generally away from or toward the substrate 8. In one embodiment, the frame sections 204a–d are fabricated by surface micromachining so as to be pre-stressed. That is, the plurality of frame sections 204a–d are fabricated so as to be in a stressed condition. One or more retention pins or the like may be attached to each of these frame sections 204a–d so as to retain each of these frame sections 204a–d in their pre-stressed state, even after the microelectromechanical system 198 is released by the use of one or more release etchants. At the desired time, each of these retention pins may be ruptured (e.g., by providing an appropriate electrical signal thereto), such that the distal end 234 of each frame section 204a–d may move at least generally away from the substrate 8 in an attempt to reduce the magnitude of the internal stresses therewithin. For instance, the frame sections 204a–d may be in an at least generally arcuate shape at this time, with the corresponding distal end 206 having moved away from the substrate 8 while the opposite end remain pinned to the substrate 8 at the corresponding anchor 208. As such, in the static state the plurality of beams 224 would be at least generally disposed within a common reference plane that is disposed at an angle relative to the substrate 8.

In another embodiment, the individual frame sections 204a–d of the embodiment of FIG. 9A are more rigid structures than the displacement multiplier 168, and in another embodiment are sufficiently rigid such that there is no substantial (or intended) flexure of the same when exposed to the types of forces that are contemplated during normal operation of the microelectromechanical system 198. In this case, the individual frame sections 204a–d would be pivotally interconnected with the substrate 8 utilizing the anchors 208, and would thereby function similarly to the displacement multiplier frame 152 of the FIG. 8 embodiment.

The displacement multiplier 212 of FIG. 9A is defined by a plurality of beams 224 and is interconnected to the displacement multiplier frame assembly 200 at four anchor locations 226. In the illustrated embodiment, the displacement multiplier 212 is symmetrical relative to a central, longitudinal reference axis 214. An output coupling 220 is disposed on this axis 214 at one end of the displacement multiplier 212 and may be interconnected with an appropriate load (e.g., the tether 40 of the positioning assembly 4 of FIGS. 1A–B), while an input coupling 216 is disposed on this axis 214 at the other end of the displacement multiplier 212 and may be interconnected with an appropriate motive source (e.g., actuator 64 of the positioning assembly 4). Application of a force to the input coupling 216 of the displacement multiplier 212 so as to move the input section 216, in the direction of the arrow A and along the axis 214, will cause various portions of the displacement multiplier 212 to pivot in an at least generally predetermined manner, and so as to also move the output coupling 220 in the direction of the arrow B and along the axis 214 of the displacement multiplier 212.

The output coupling 220 of the displacement multiplier 212 is disposed at a higher elevation than the input coupling 216 of the displacement multiplier 212 in the case were the frame sections 204a–d are "pre-stressed" or when the displacement multiplier 212 is otherwise exposed to non-collinear forces at its input coupling 216 and output coupling 220. Stated another way, the displacement multiplier 212 is disposed "out-of-plane" relative to the substrate 8 when the frame sections 204a–d are pre-stressed or when the displacement multiplier 212 is exposed to non-collinear forces. This increases the clearance of the entirety of the displacement multiplier 212 from the substrate 8. As such, exposure of the displacement multiplier 212 to non-collinear forces at its input coupling 216 and output coupling 220 (for instance, when the output coupling 220 is exposed to a vertical force component, such as when the tether 40 pulls the apex 22 of the elevator 20 away from the substrate 8) should not cause any contact between the displacement multiplier 212 and any underlying portion of the MEM system 198.

Figure 9B:
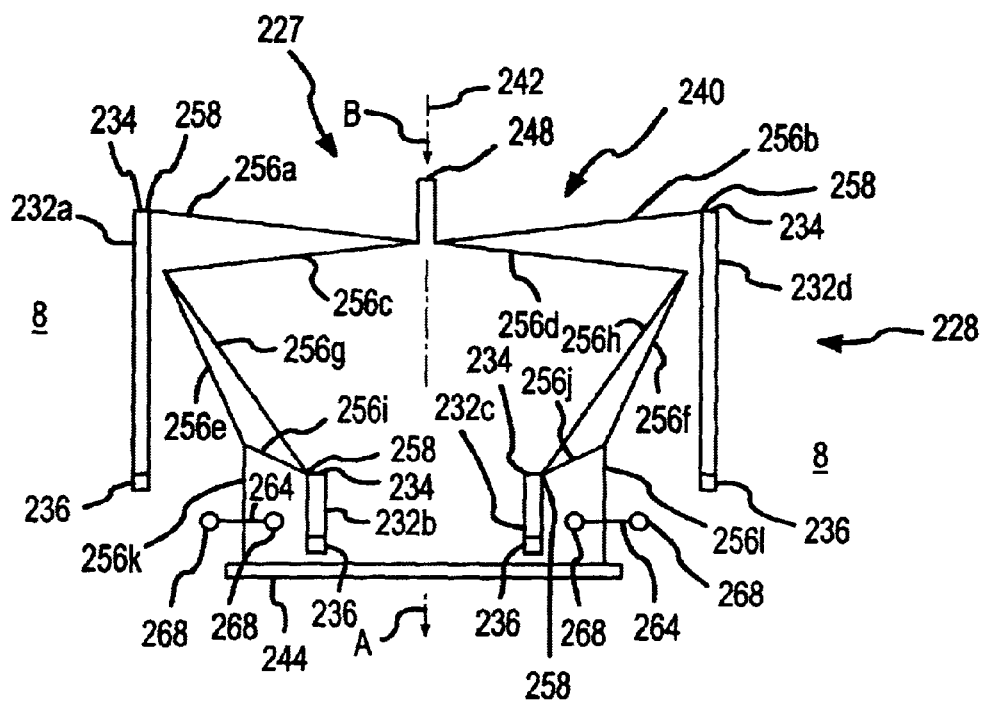
FIG. 9B is a plan view of one embodiment of a displacement multiplier that is mounted on one embodiment of a frame assembly, that in turn is pivotally interconnected with a substrate, and that also uses doubly clamped beams.

FIG. 9B illustrates another embodiment for providing non-collinear force compensation in a microelectromechanical system, including without limitation in terms of reducing the potential for undesired contact with an underlying portion of the system due to exposure to non-collinear forces. The MEM system 227 of FIG. 9B includes a displacement multiplier 240 that is mounted on (e.g., pinned or anchored) a displacement multiplier frame assembly 228, that in turn is movably interconnected with the substrate 8. Components of the frame assembly 228 include a plurality of individual frame sections 232a–d. One end of each frame section 232a–d is interconnected with the substrate 8 by a frame anchor 236, while a distal end 234 of each frame section 232a–d is not attached to the substrate 8 so as to be able to move at least generally away from or toward the substrate 8. The frame sections 232 of the FIG. 9B embodiment may be configured in any of the manners discussed above in relation to the frame sections 204 of the FIG. 9A embodiment.

The displacement multiplier 240 is defined by a plurality of beams 256 and is interconnected to the displacement multiplier frame assembly 228 at four anchor locations 258. In the illustrated embodiment, the displacement multiplier 240 is symmetrical relative to a central, longitudinal reference axis 242. An output coupling 248 is disposed on this axis 242 at one end of the displacement multiplier 240 and may be interconnected with an appropriate load (e.g., the tether 40 of the positioning assembly 4 of FIGS. 1A–B), while an input coupling 244 at the other end of the displacement multiplier 240 and may be interconnected with an appropriate motive source (e.g., actuator 64 of the positioning assembly 4). Application of a force to the input coupling 244 of the displacement multiplier 240 so as to move the input coupling 244, in the direction of the arrow A and along the axis in 242, will cause various portions of the displacement multiplier 240 to pivot in an at least generally predetermined manner, and so as to also move the output coupling 248 in the direction of the arrow B and along the axis 242 of the displacement multiplier 240.

The output coupling 248 of the displacement multiplier 240 is disposed at a higher elevation than the input coupling 244 of the displacement multiplier 240 in the case were the frame sections 232a–d are "pre-stressed" or when the displacement multiplier 240 is otherwise exposed to non-collinear forces at its input coupling 244 and its output coupling 248. Stated another way, the displacement multiplier 240 is disposed "out-of-plane" relative to the substrate 8. This increases the clearance of the entirety of the displacement multiplier 240 from the substrate 8. As such, exposure of the displacement multiplier 240 to non-collinear forces at its input coupling 244 and output coupling 248 (for instance, when the output coupling 248 is exposed to a vertical force component, such as when the tether 40 pulls the apex 22 of the elevator 20 away from the substrate 8) should not cause any contact between the displacement multiplier 240 and any underlying portion of the microelectromechanical system 227.

In order to reduce the magnitude of any vertical force component that is transmitted to the input coupling 244, and thereby any microstructure that may be interconnected therewith (e.g., actuator 64), at least one doubly clamped beam 264 is utilized by the microelectromechanical system 227. Stated another way, any such doubly clamped beam 264 at least assists in the redirection of the force exerted on the output coupling 248 so as to be at least generally collinear with the force exerted on the input coupling 244. At least one doubly clamped beam 264 is attached to the beams 256k, 356l of the displacement multiplier 240. These beams 256k, 356l are disposed on opposite sides of the central, longitudinal reference axis 242 of the displacement multiplier 240 and are attached to the input coupling 244 of the displacement multiplier 240. Each doubly clamped beam 264 is attached to the respective beam 256k, 356l of the displacement multiplier 240, and further is interconnected with the substrate 8 on both sides of the respective beam 256k, 356l via an anchor 268. As such, the inclusion of the doubly clamped beams 264 constrains upward motion of the beams 256k, 356l when the output coupling 248 of the displacement multiplier 240 is exposed to a vertical force component. This then reduces the amount of the vertical force component that is transferred to the structure that is interconnected with the input coupling 244 of the displacement multiplier 240 (e.g., the actuator 64). Reducing the amount of any vertical force component that is transferred to the actuator 64 when interconnected with the input coupling 244 of the displacement multiplier 240 is desirable in that the actuator 64 moves laterally relative to the substrate 8, and such a vertical force component may adversely affect one or more aspects of the operation of such an actuator 64. Once again, the doubly clamped beams 264 may be characterized as at least assisting in the redirection of the force that is exerted on the output coupling 248 so as to be at least generally collinear with the force being exerted on the input coupling 244.

Figure 9C:
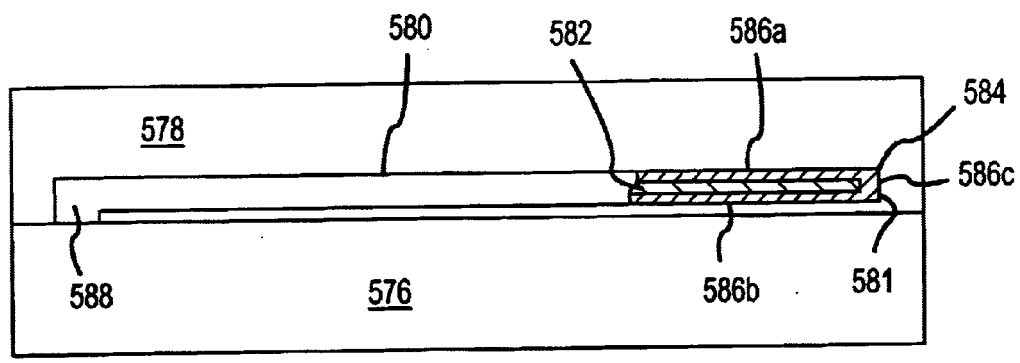
FIG. 9C is a side view of one embodiment of a pre-stressed member that may be utilized by the frame/frame assembly of FIGS. 8–9B at a time prior to executing an etch release.
Figure 9D:
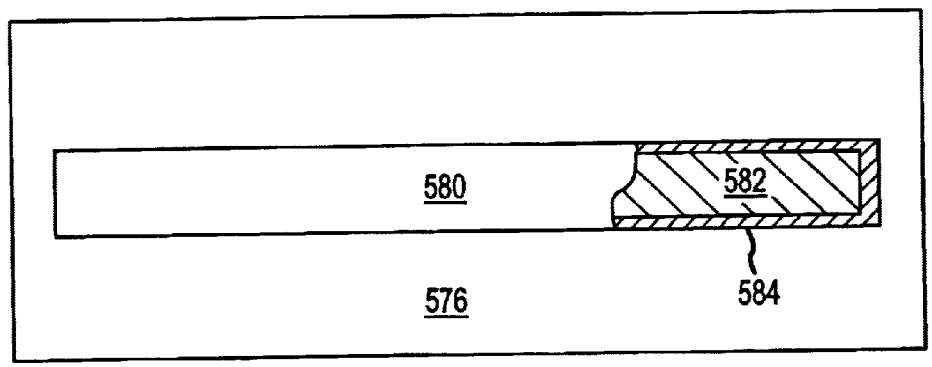
FIG. 9D is a top view of the pre-stressed member of FIG. 9C after being released.
Figure 9E:
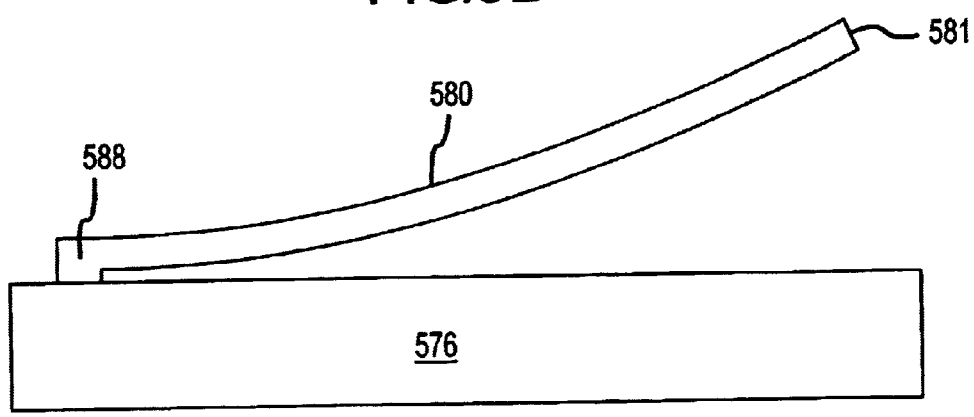
FIG. 9E is a side view of the pre-stressed member of FIG. 9D.

One embodiment that may be utilized for realizing a pre-stressed condition for the plurality of beams 204 or the plurality of beams 232 is illustrated in FIGS. 9C–E. FIG. 9C illustrates a pre-stressed member 580 during the fabrication process and prior to performing the etch release. As such, the pre-stressed member 580 in FIG. 9C is still embedded within a sacrificial material 578. An anchor 588 structurally interconnects the pre-stressed member 580 and an underlying substrate 576 that is used in the fabrication of the pre-stressed member 580 and other portions of a microelectromechanical system that includes the pre-stressed member 580. Any appropriate configuration may be utilized for the anchor 588 and the same may be disposed at any appropriate location along the pre-stressed member 580 so as to define a free end 581 that is able to move at least generally away from or at least generally toward the substrate 576.

The pre-stressed member 580 includes a core 582 that is encased within a body 584. The core 582 and the body 584 are formed from different materials. In one embodiment, the core 582 of the pre-stressed member 580 utilizes the same composition as the sacrificial material 578 that is removed by the release etchant, while the body 584 is formed from an appropriate structural material for surface micromachining applications. As such, the core 582 is not removed by the release etchant due to the encasement that is provided by the body 584. In this regard, the body 584 includes an upper wall 586a, a lower wall 586b, and an interconnecting sidewall 586c that define an enclosed space that contains the core 582. In one embodiment, the upper wall 586a and the lower wall 586b are of different thicknesses.

When the sacrificial material 578 is removed by an appropriate release etchant and as illustrated in FIGS. 9D–E, the free end 581 of the pre-stressed member 580 moves at least generally away from the substrate 576. This movement is due to a stress gradient that exists within the pre-stressed member 580 as a result of the encasement of the core 582 within the body 584, as well as the upper wall 586a and the lower wall 586b of the body 584 being of different thicknesses. This stress gradient bends the free end 581 of the pre-stressed member 580 out of the plane of the substrate 576 and at least generally about the anchor 588 to accommodate the stress gradient when the surrounding sacrificial material 578 is removed during the etch-release step. The pre-stressed member 580 thereby in effect forms a compressed spring which exerts an at least generally upwardly-directed force on any structure interconnected therewith to at least attempt to move the same away from the substrate 576.

Figures 10A, 10B:
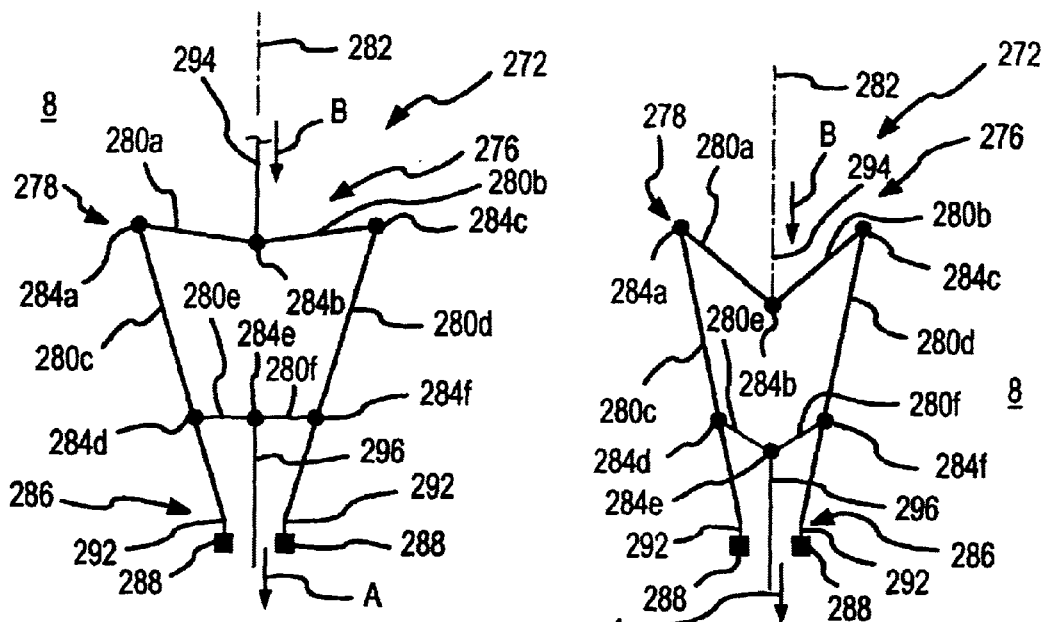
FIGS. 10A–B are plan views of one embodiment of a displacement multiplier that is pivotally interconnected with a substrate.

FIGS. 10A–B illustrates another embodiment for providing non-collinear force compensation in a microelectromechanical system, including without limitation in terms of reducing the potential for undesired contact with an underlying portion of the system due to exposure to non-collinear forces. Generally, the MEM system 272 of FIGS. 10A–B utilizes a displacement multiplier 276 that is mounted on (e.g., pinned or anchored) the substrate 8 in a manner so as to allow at least part of the displacement multiplier 276 to move at least generally away from the substrate 8 when the displacement multiplier 276 is exposed to non-collinear forces and including where at least one of these forces has a vertical force component. The displacement multiplier 276 is defined by a plurality of beams 280 that are interconnected by a plurality of flex joints 284. In the illustrated embodiment, the displacement multiplier 276 is symmetrical relative to a central, longitudinal reference plane 282.

One end/end portion of each of the beams 280c, 280d is interconnected with the substrate 8 by a flexure 292 and an anchor 288. Each flexure 292 is more flexible (i.e., less rigid) than its corresponding beam 280c, 280d. Only two structural interconnections exist between the displacement multiplier 276 and the substrate 8. Generally, the displacement multiplier 276 is interconnected with the substrate 8 so that an output end 278 of the displacement multiplier 276 is able to move at least generally away from or toward the substrate 8 (depending upon the direction of the force acting on the output end 278), typically along an at least generally arcuate path. Stated another way, an input end 286 of the displacement multiplier 276 is in effect pinned to the substrate 8 so as to allow the output end 278 to in effect move at least generally about an axis that extends through the anchors 288 by a bending of the flexures 292. Although the desired pivoting is realized in the illustrated embodiment by anchoring the displacement multiplier 272 to the substrate 8 at only two locations, it may be possible to anchor the displacement multiplier 272 to the substrate 8 at more than two locations and still realize the desired pivotal motion. For instance, the displacement multiplier 272 could be anchored to the substrate at two or more locations, so long as these anchor locations are at least generally disposed along a common axis. It should be appreciated that the four structural interconnections between the displacement multiplier 44 and the substrate 8 that are used in the case of the displacement multiplier 44 of FIGS. 1A–B would not allow for this same type of desired pivotal movement.

An output beam 294 is disposed at least generally along a central, longitudinal reference axis 282 at one end of the displacement multiplier 276, is interconnected with the flex joint 284b that is disposed on this reference axis 282, and may be interconnected with an appropriate load (e.g., the tether 40 of the positioning assembly 4 of FIGS. 1A–B). The output beam 294 could also actually be the tether 40. The displacement multiplier 276 also includes an input beam 296 that is disposed at the opposite end of the displacement multiplier 276, that is interconnected with flexure joint 284e that is also disposed on the noted reference axis 282, and that may be interconnected with an appropriate motive source (e.g., the actuator 64 of the positioning assembly 4). The input beam 296 could be in the form of a tether or coupling that interconnects the displacement multiplier 276 with one or more actuators.

It should be appreciated that application of a force to the input beam 296 so as to move the input beam 296 in a direction that is at least generally parallel with the arrow "A" and along the plane 282, will cause various portions of the displacement multiplier 276 to pivot in at least a generally predetermined manner, so as to also move the output beam 294 in a direction that is at least generally parallel with the arrow "B" and along the reference axis 282 of the displacement multiplier 276. FIG. 10A illustrates the configuration of the displacement multiplier 276 before application of a motive force to the input beam 296, while FIG. 10B illustrates the "collapsed" configuration of the displacement multiplier 276 during/after the application of the force to the input beam 296.

In the event that the displacement multiplier 276 is not exposed to any vertical force component at its output end 278, the pivoting of the displacement multiplier 276 will be at least generally within a plane that is at least generally parallel with the substrate 8. Exposure of the output end 278 of the displacement multiplier 276 to a vertical force component will still allow the displacement multiplier 276 to move from the general configuration of FIG. 10A to the general configuration of FIG. 10B to provide the general displacement multiplication/reduction or translation function. However, since the displacement multiplier 276 is only interconnected with the substrate 8 along both sides of the reference axis 282 and at least toward the input end 286 of the displacement multiplier 276, the output beam 294 and the output end 278 of the displacement multiplier 276 are both allowed to move at least generally away from the substrate 8 when the vertical force component is directed away from the substrate 8. This movement may be along any appropriate path (e.g., along an arc) and in any orientation relative to the substrate 8. Generally, the movement of the output beam 294 and the output end 278 of the displacement multiplier 276 at least generally away from the substrate 8 upon exposure of the output end 278 to a vertical force component that is directed away from the substrate 8 should significantly reduce the potential for any contact between the displacement multiplier 276 and any underlying portion of the microelectromechanical system 272.

Figure 11:
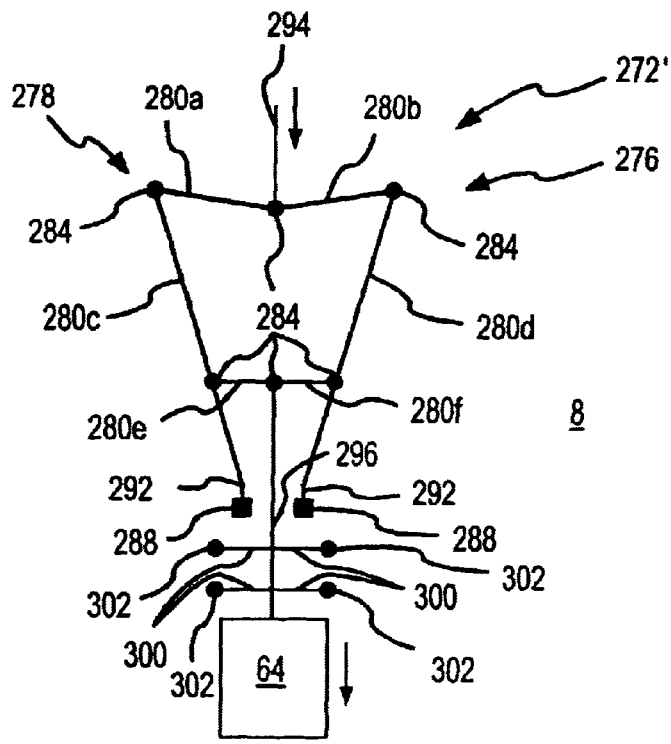
FIG. 11 is a plan view of one embodiment of a displacement multiplier that is pivotally interconnected with a substrate, and that utilizes a plurality of doubly clamped beams that are attached to an input beam of the displacement multiplier.

Another way of addressing the exposure of the output beam 294 to a vertical force component is through the use of one or more doubly clamped beams in relation to the input side of the displacement multiplier 276. Such a configuration is presented by the MEM system 272' of FIG. 11. The "single prime" designation indicates that there is at least one difference from the configuration presented in FIGS. 10A–B. This difference is the presence of at least one doubly clamped beam 300 which is associated with the input beam 296 of the displacement multiplier 276, which is illustrated in FIG. 11 as being interconnected with the actuator 64. Each beam 300 is attached to the input beam 296 of the displacement multiplier 276, and further is interconnected with the substrate 8 on both sides of input beam 296 via an anchor 302. As such, the inclusion of the doubly clamped beams 300 constrains upward motion of the input beam 296 when the output end 278/output beam 294 of the displacement multiplier 276 is exposed to a vertical force component. This then reduces the amount of the vertical force component that is transferred to the structure that is interconnected with the input beam 296 of the displacement multiplier 272 (e.g., the actuator 64). Reducing the amount of any vertical force component that is transferred to the actuator 64 when interconnected with the input beam 296 of the displacement multiplier 276 is desirable in that the actuator 64 moves laterally relative to the substrate 8, and such a vertical force component may adversely affect one or more aspects of the operation of this actuator 64.

Figure 12A:
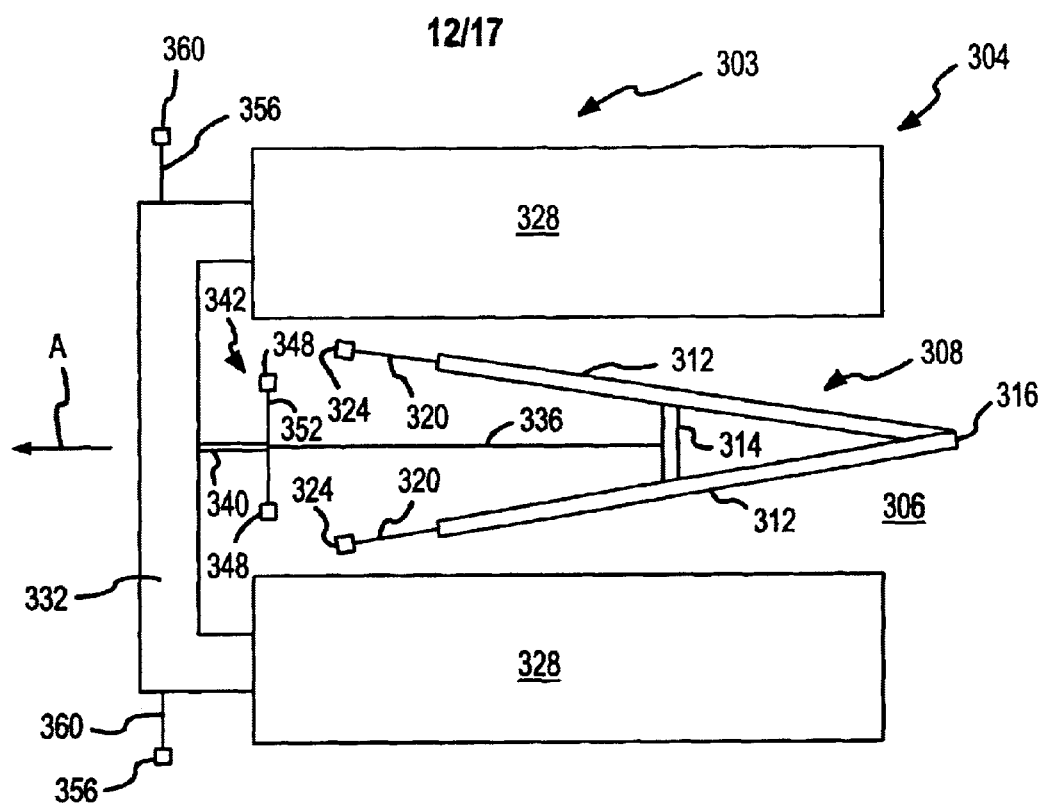
FIG. 12A is a plan view of one embodiment of a positioning assembly that utilizes a doubly clamped beam that is attached to an interconnecting elongate tether between an actuator output yoke and an elevator.

FIG. 12A presents an embodiment for a exerting a positioning force on a microstructure that does not utilize a displacement multiplier, but which still compensates for non-collinear forces, including where at least one of those forces has a vertical force component. The positioning assembly 304 generally includes an elevator 308 that is interconnected with a pair of actuators 328 by a tether 336. The elevator 308 is defined by a pair of elevation members 312. One end of each elevation members 312 is interconnected with a flexure 320, that in turn is interconnected with an anchor 324 attached to/extending upwardly from a substrate 306. The opposite ends of the elevation members 312 intersect to define a free end or apex 316 of the elevator 308. The elevation members 312 are also interconnected by an intermediate cross beam 314 at a location that is spaced from its free end 316.

The pair of lateral actuators 328 are disposed on opposite sides of the elevator 308, are interconnected with the substrate 306 in an appropriate manner to allow the same to move laterally relative to the substrate 306, and are interconnected by a common output yoke 332. The output yoke 332 is a rigid structure that is movably interconnected with the substrate 306 by a plurality of flexures 356. At least one flexure 356 is disposed on each side out of the output yoke 332 and is fixed to the substrate 306 by an anchor 360. A flexible yoke interconnect 340 extends from the output yoke 332 and is interconnected with the tether 336. The opposite end of the tether 336 is appropriately attached to the cross beam 314. Since the cross beam 314 is spaced from the free end 316 of the elevator 308, this reduces the amount of lateral displacement of the actuators 328 that is required to move the free end 316 of the elevator 312 relative to the substrate 306 a predetermined distance. Moving the cross beam 314 further away from the free end 316 of the elevator 308 will further reduce the amount of lateral movement of the actuators 328 that is required to displace the free end 316 of the elevator 308 this same predetermined distance relative to the substrate 306.

Movement of the actuators 328 in the direction that is parallel with the direction of the arrow A in FIG. 12A exerts a pulling force on the tether 336, that in turn pivots the elevator 308 at least generally about an axis than extends through the anchors 324 that interconnect the elevator 308 with the substrate 306. This pivoting action is by a bending of the flexures 320. The forces acting on the opposite ends of the tether 336 are thereby not collinear. The force acting on that end of the tether 336 that is attached to the elevator 308 includes a vertical force component. This vertical force component is exerted on the flexible yoke interconnect 340, and is transferred to the output yoke 332 and each of the actuators 328. In order to at least reduce the magnitude of the vertical force component that is transferred to the actuators 328, the positioning assembly 304 utilizes at least one doubly clamped beam 352 that is attached to the tether 336, the yoke interconnect 340, or both, and that is fixed to the substrate 306 by a pair of anchors 348. At least one anchor 348 is disposed on each side of the tether 336.

In the illustrated embodiment, there is a single doubly clamped beam 352. This doubly clamped beam 352 is located near the output yoke 332. This arrangement allows the elevator 308 to be placed in close proximity to the output yoke 332, which in turn results in an efficient use of space on the substrate. In any case, a vertical force that is exerted on the end of the tether 336 that is attached to the elevator 308 is vertically restrained by the doubly clamped beam 352, that in turn reduces the magnitude of the vertical force component that is transmitted to the output yoke 332 and thereby the actuators 328. Multiple doubly clamped beams 352 could be utilized as well.

Figure 12B:
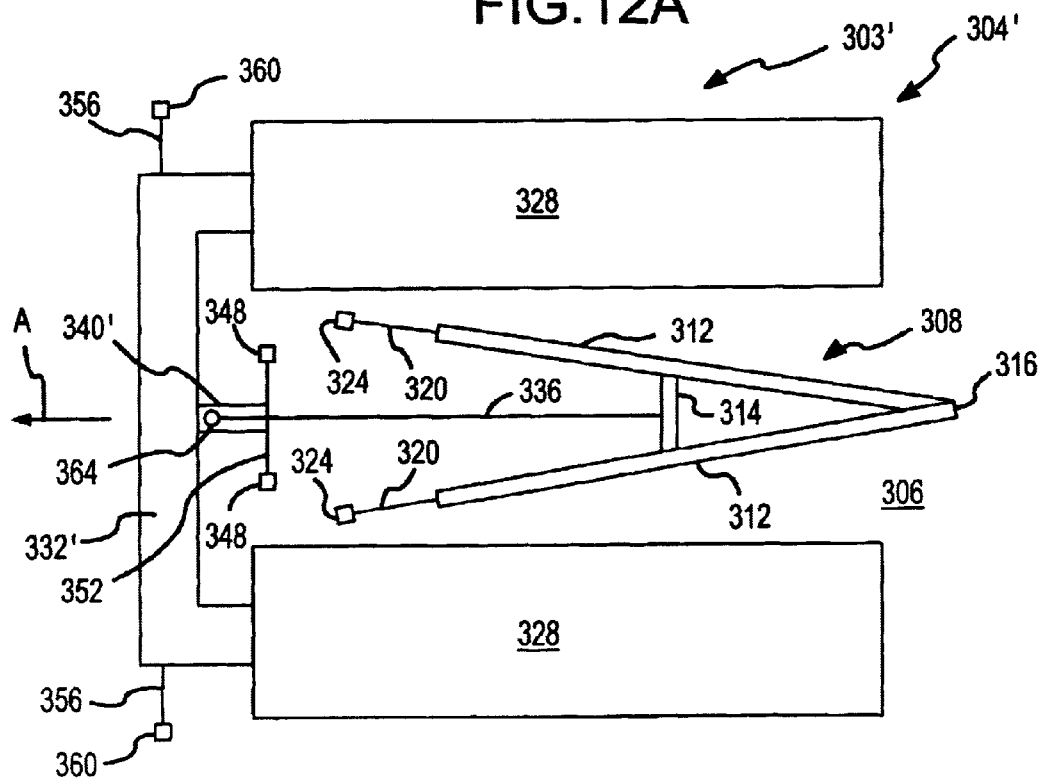
FIG. 12B is a plan view of another embodiment of a positioning assembly that utilizes a doubly clamped beam that is attached to an interconnecting elongate tether between an actuator output yoke and an elevator.

FIG. 12B presents another embodiment for exerting a positioning force on a microstructure that does not use a displacement multiplier, but which still compensates for non-collinear forces, including where at least one of the forces has a vertical force component. The embodiments of FIGS. 12A and 12B are similar, and similar components thereby use the same reference numerals. Those components/assemblies that are different in at least one respect are identified by a "single prime" designation. The primary difference between the positioning assembly 304' of FIG. 12B and the positioning assembly 304 of FIG. 12A is in relation to the yoke interconnect 340' and the interconnection of the same with the tether 336. The yoke interconnect 340' is a more rigid structure in the case of the FIG. 12B embodiment. A post 364 is anchored to and extends upwardly from the yoke interconnect 340' in longitudinally offset relation to the doubly clamped beam 352. Stated another way, the post 364 and the cross beam 314, which interconnect with opposite ends of the tether 336, are disposed on opposite sides of the doubly clamped beam 352. This also disposes the point of interconnection closer to an axis that extends through the pair of flexures 356 that interconnect the output yoke 332 with the substrate 306. Since the length of the moment arm is reduced in comparison to the FIG. 12A in embodiment, the magnitude of the moment experienced by the flexures 356 is reduced in the case of the FIG. 12B embodiment compared to the FIG. 12A embodiment.

Figure 13:
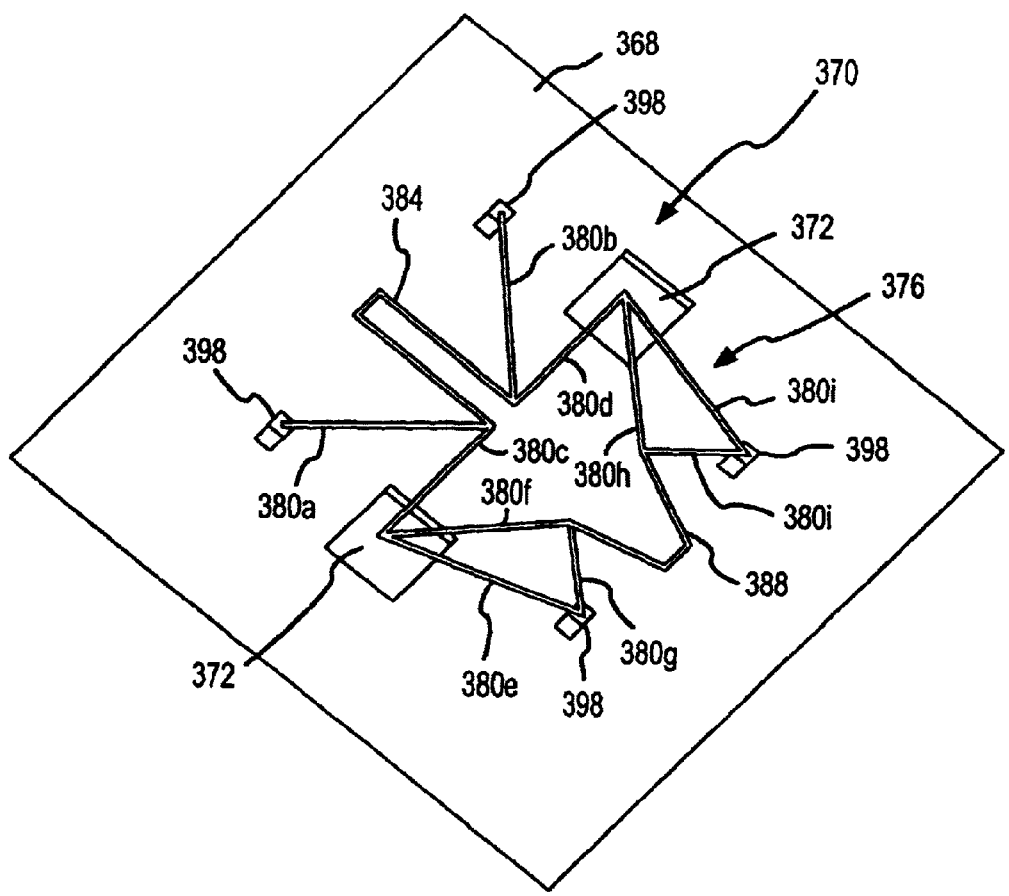
FIG. 13 is a plan view of one embodiment of a displacement multiplier, where a pair of cavities are formed in the substrate under the "lateral extremes" of the displacement multiplier.

Another option for compensating for the existence of non-collinear forces when using a displacement multiplier is presented in FIG. 13. The microelectromechanical system 370 of FIG. 13 includes a displacement multiplier 376. This displacement multiplier 376 is defined by a plurality of beams 380 that are interconnected in a manner so as to allow for a desired degree of lateral movement of an input yoke 388 and output yoke 384 of the displacement multiplier 376. This again is provided by a flexing of at least those beams 380 that are fixed to an anchor 398, that is in turn fixed to the substrate 368. Four anchors 386 are utilized by the displacement multiplier 376.

A plurality of cavities or wells 372 are formed in the substrate 368 under portions of the displacement multiplier 376 that would tend to deflect the most toward the substrate 368 when the forces exerted on the output yoke 384 and the input yoke 388 are not collinear (for instance, when the output yoke 384 is exposed to a vertical force component). Generally, a cavity or well 372 within the substrate 368 is formed under those portions of the displacement multiplier 376 that will tend to deflect toward the substrate 368 the most when the displacement multiplier 376 is exposed to non-collinear forces, including where one of these forces has a vertical force component. Stated another way, an appropriately sized cavity 372 is formed in the substrate 368 under those portions of the displacement multiplier 376 that are susceptible to contacting the substrate 368 when exposed to the magnitudes of non-collinear forces that would be anticipated during normal operation of the microelectromechanical system 370. One or more doubly clamped beams (not shown) of the type discussed above could be attached to the input yoke 388 or an interconnecting structure between the input yoke 388 and a microstructure that exerts a load on the input yoke 388 (e.g., one or more actuators). Preferably, the output yoke 384 is configured in the manner of any of the relief structures of FIGS. 2–7 that were discussed above.

Figure 14:
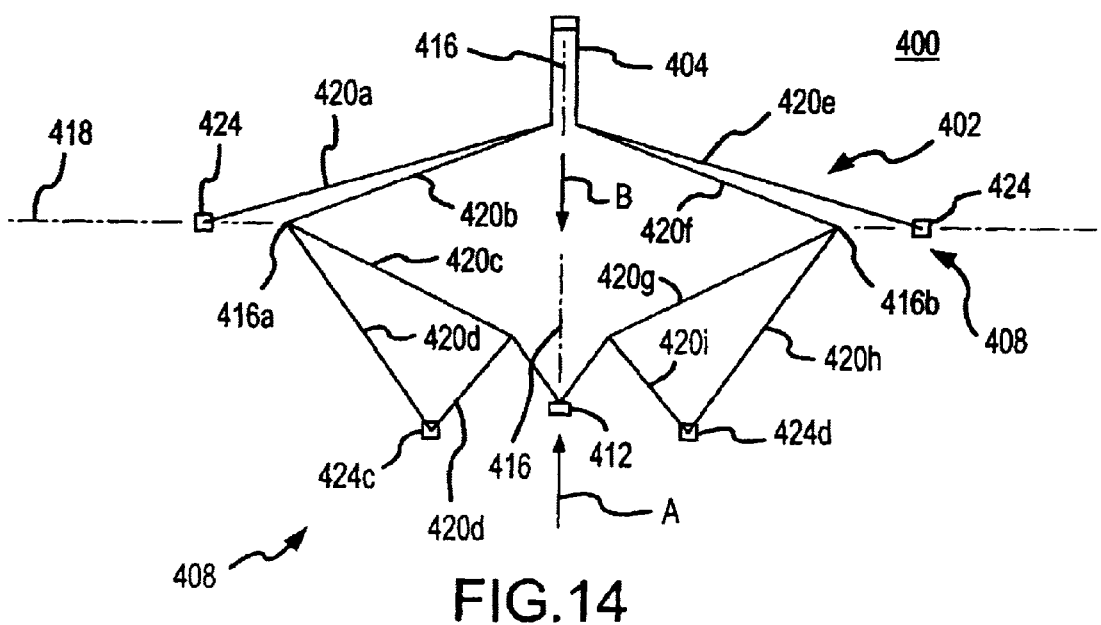
FIG. 14 is a plan view of one embodiment of a displacement multiplier where its anchor locations for fixing the same to a substrate are selected to reduce the amount of deflection toward the substrate when the displacement multiplier is exposed to non-collinear forces.

Another option for compensating for the existence of non-collinear forces when using a displacement multiplier is presented in FIG. 14. The microelectromechanical system 408 of FIG. 14 includes a displacement multiplier 402. This displacement multiplier 402 is defined by a plurality of beams 420 that are interconnected in a manner so as to allow for a desired degree of lateral movement of an input yoke 412 and an output yoke 404 of the displacement multiplier 402. This again is provided by a flexing of at least those beams 420 that are fixed to an anchor 424, that is in turn fixed to a substrate 400. In the case of the displacement multiplier 402, the input yoke 412 and the output yoke 404 move in opposite directions. The input yoke 412 moves at least generally in the direction of the arrow A, while the output yoke 404 moves at least generally in the direction of the arrow B.

Compensation for non-collinear forces that are exerted on the input yoke 412 and the output yoke 404 is provided for the displacement multiplier 402 by the selection of location of at least some of the anchors 424 of the displacement multiplier 402 to the substrate 400. Nodes 416a, 416b are disposed on opposite sides of a central, longitudinal reference axis 416 of the displacement multiplier 402, and are the portions of the displacement multiplier 402 that are disposed furthest from this axis 416. A lateral reference axis 418 extends through the nodes 416a, 416b, and in the illustrated embodiment the axis 418 is perpendicular to the central, longitudinal reference axis 416, although this may not necessarily be the case for all configurations of the displacement multiplier 402. Generally, compensation for non-collinear forces being exerted on the input yoke 412 and the output yoke 404 is provided in the case of the FIG. 14 embodiment by having all of the anchors 424 disposed at a longitudinal position that is no closer to the output yoke 404 than the reference axis 418. Another characterization is that all of the anchors 424 are disposed at a longitudinal position that is no further from the longitudinal position of the input section 412 than the longitudinal position of the reference axis 418. Having the anchors 424 of the displacement multiplier 402 to the substrate 400 satisfy one or both of the noted characterizations reduces the potential for nodes 416a, 416b deflecting an amount so as to contact the substrate 400 during normal operation of the microelectromechanical system 408. One or more doubly clamped beams (not shown) of the type discussed above could be attached to the input yoke 412 or an interconnecting structure between the input yoke 412 and a microstructure that exerts a load on the input yoke 412 (e.g., one or more actuators).

Figure 15A:
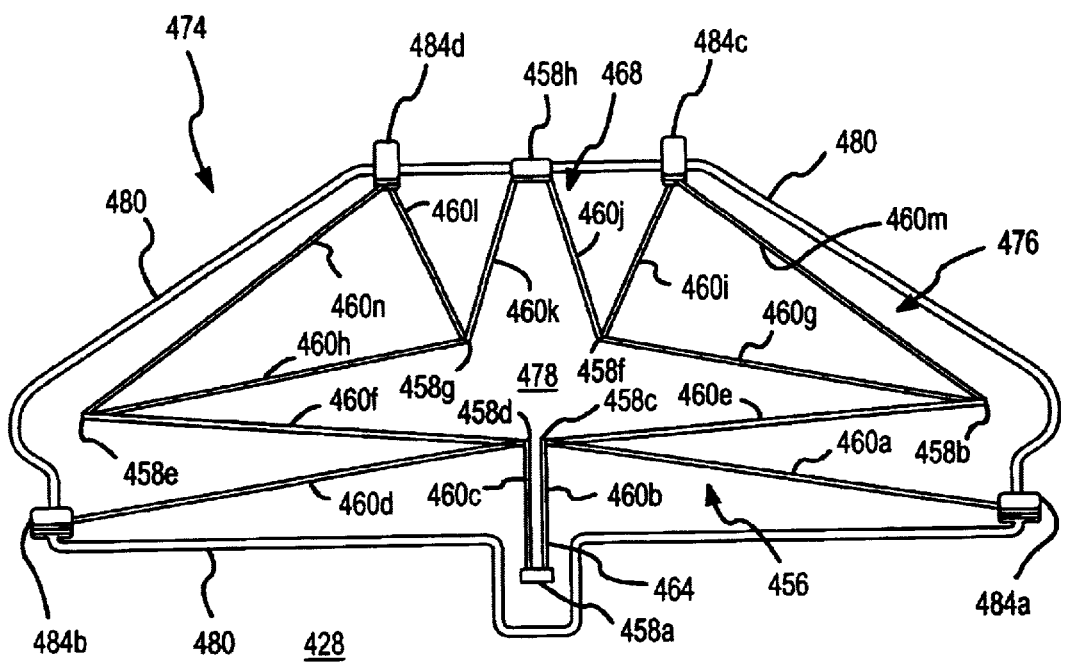
FIG. 15A is a plan view of one embodiment of a displacement multiplier that is at least substantially disposed within a cavity formed in a substrate.
Figure 15B:
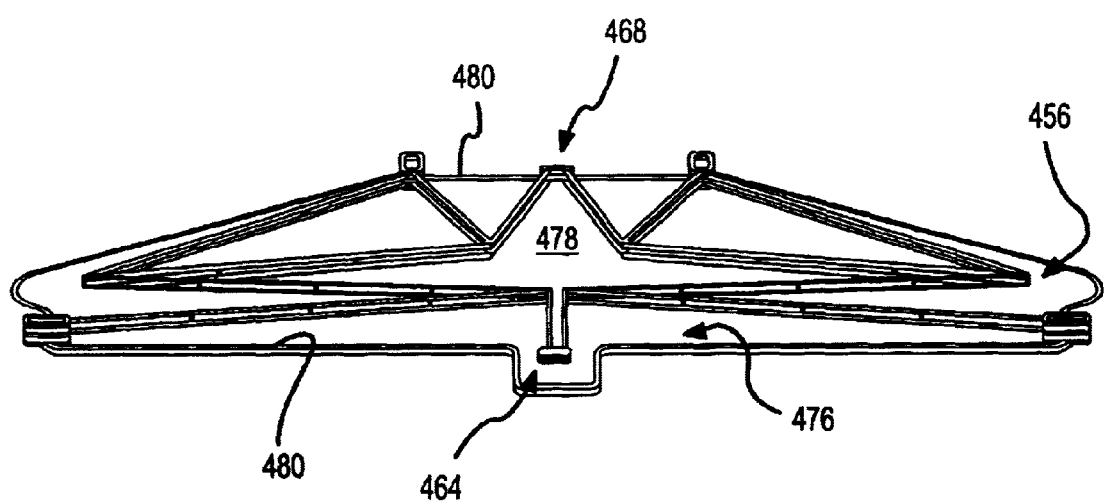
FIG. 15B is a perspective view of the embodiment of FIG. 15A.

Another option for: compensating for the existence of non-collinear forces when using a displacement multiplier is presented in FIGS. 15A–B. The microelectromechanical system 474 includes a displacement multiplier 456. This displacement multiplier 456 of FIGS. 15A–B is defined by a plurality of beams 460 that are interconnected in a manner so as to allow for a desired degree of lateral movement of an input yoke 468 and an output yoke 464 of the multiplier microstructure 456. This again is provided by a flexing of at least those beams 460 that are fixed to an anchor 484, that is in turn fixed to a substrate 428.

Compensation for non-collinear forces that are exerted on the input yoke 468 and the output yoke 464 is provided for the displacement multiplier 456 in the form of a recess or cavity 476 that is formed in the substrate 428 under at least a substantial portion of the displacement multiplier 456. A base 478 defines the bottom of the cavity 476, and a wall 480 defines a perimeter of this cavity 476. In the illustrated embodiment, the wall 480 also extends upwardly from the portion of the substrate 428 that is adjacent to the cavity 476 as well, although such is not required.

The anchors 484 for the displacement multiplier 456 are disposed at least generally proximate the wall 480 of the cavity 476. The only portion of the displacement multiplier 456 of FIGS. 15A–B that is not disposed entirely within the cavity 476 are the interconnecting structures between the beams 460 of the displacement multiplier 456 and the corresponding anchors 484. Another characterization of the displacement multiplier 456 in relation to the cavity 476 is that all free ends 458 of the displacement multiplier 456 are disposed within the cavity 476. The free ends 458 are those portions of the displacement multiplier 456 that are cantilevered of sorts and that could deflect down and engage the underlying structure, and thereby include both the input yoke 468 and the output yoke 464. As such, the "free ends" 458 obviously excludes those ends of the beams 460 of the displacement multiplier 456 that are attached to an anchor 484.

The purpose of the cavity 476 is to increase the spacing between the various beams 460 of the displacement multiplier 456 and the underlying structure (the base 478 in the FIGS. 15A–B embodiment), or at least the spacing between the "free ends" 458 and the base 478, to reduce the potential for contact therebetween when the displacement multiplier 456 is exposed to non-collinear forces at its input yoke 468 and its output yoke 464. In one embodiment, each free end 458 of the displacement multiplier 456 is separated from the base 478 of the cavity 476 by a distance of at least about 7 microns. One or more doubly clamped beams (not shown) of the type discussed above could be attached to the input yoke 468 or an interconnecting structure between the input yoke 468 and a microstructure that exerts a load on the input yoke 468 (e.g., one or more actuators). Preferably, the output yoke 464 is configured in the manner of any of the relief structures of FIGS. 2–7 that were discussed above.

Figure 16A:
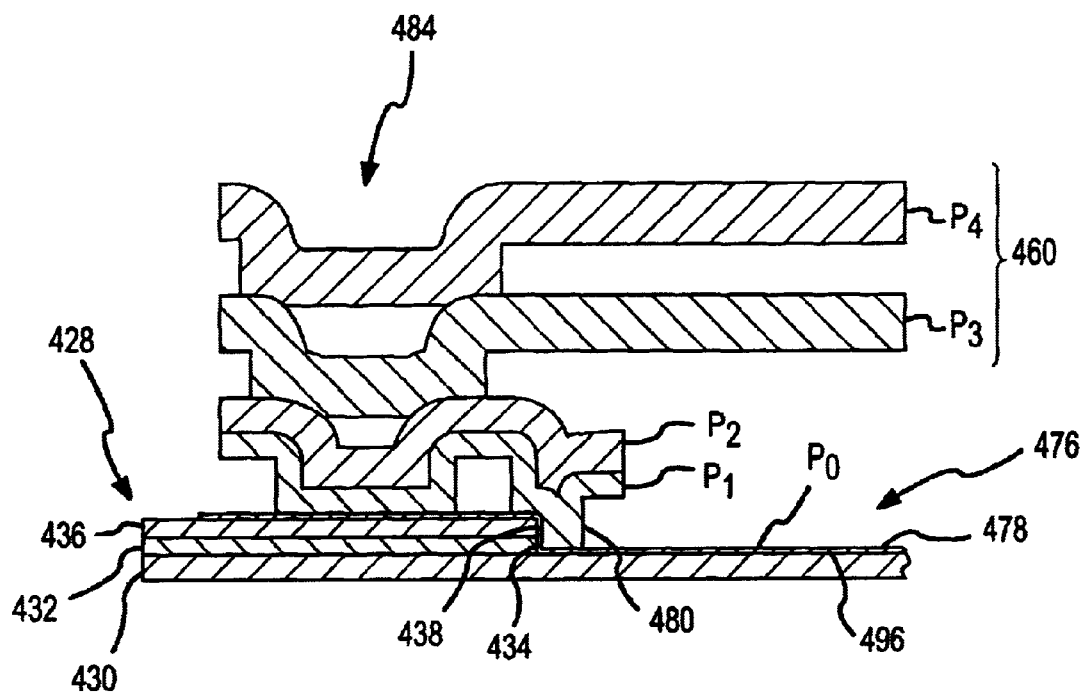
FIG. 16A is a cross-sectional view at the wall of the cavity of the embodiment of FIGS. 15A–B.

Further details regarding the cavity 476 of FIGS. 15A–B are presented in FIG. 16A. In the case where the microelectromechanical system 474 is formed at least in part by surface micromachining, the substrate 428 may be characterized as being defined by a wafer material 430, an overlying oxide layer 432, and an overlying nitride layer 436 as illustrated in FIG. 16A. The oxide layer 432 and the nitride layer 436 may collectively define a dielectric layer for the microelectromechanical system 474 that includes the displacement multiplier 456. In any case, one way in which the cavity 476 and its perimeter wall 480 may be defined is by patterning the nitride layer 436 and oxide layer 432 to define a similarly shaped (to the desired cavity 476), but larger cavity. This cavity would extend down through the nitride layer 436 and the oxide layer 432 to an exposed surface 496 of the wafer material 430. The perimeter of this cavity would then be defined by at least an edge surface 438 of the nitride layer 436 and by an edge surface 434 of the oxide layer 432. When the microelectromechanical system 474 is released, the system 474 is exposed to a release etchant to remove at least certain sacrificial oxide material. This release etch would also etch away at the oxide layer 432 if access is provided thereto via the edge surface 434. This would not be desirable.

In order to protect the oxide layer 432 during the above-noted release etch, and as illustrated in FIG. 16A a relatively thin polysilicon layer $P_0$ is deposited on the nitride layer 436, along the edge surfaces 438 and 434 of the nitride layer 436 and oxide layer 432, respectively, and on the exposed surface 496 of the wafer material 430. Thereafter, this polysilicon layer $P_0$ may be patterned to remove relevant portions thereof that are disposed outside of the cavity 476, although such is not required for purposes of reducing the potential for contact between the displacement multiplier 456 and the base 478 of the cavity 476. The polysilicon layer $P_0$ could also be patterned to remove the polysilicon layer $P_0$ to expose the surface 496 of the wafer material 430 for the base 478 of the cavity 476, provided that the polysilicon layer $P_0$ still defines the exposed surface of the wall 480 (i.e., such that the polysilicon layer $P_0$ still seals the previously exposed edge surface 434 of the oxide layer 432).

Additional polysilicon layers may be used to reduce the potential for the release etchant having access to the exposed edge surface 434 of the oxide layer 432 and as also illustrated in FIG. 16A. Polysilicon layers $P_1$ and $P_2$ may be sequentially deposited and patterned (with an intermediate layer of sacrificial material being deposited/patterned therebetween in accordance with conventional surface micromachining techniques) into the configuration presented in FIG. 16A to not only define a lower portion of the illustrated anchor 484, but to also increase the thickness of polysilicon that seals the previously exposed edge surface 434 of the oxide layer 432. Thereafter, polysilicon layers $P_3$ and $P_4$ may be sequentially deposited and patterned (with an intermediate layer of sacrificial material being deposited/patterned therebetween in accordance with surface micromachining techniques) into the configuration presented in FIG. 16A to define an upper portion of the illustrated anchor 484 and also to define the various beams 460 of the displacement multiplier microstructure 456. That is, the beams 460 of the displacement multiplier microstructure 456 may be defined by a pair of vertically spaced and structurally interconnected polysilicon layers $P_3$ and $P_4$ in the embodiment of FIG. 16A.

Figure 16B:
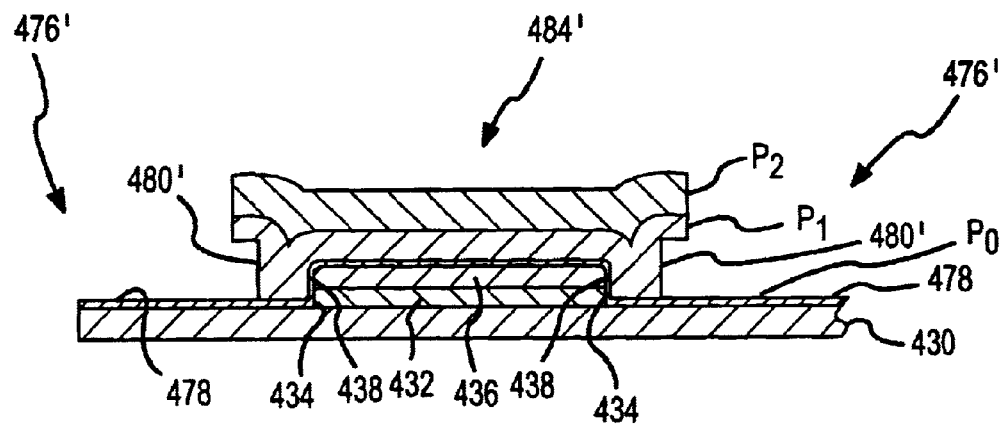
FIGS. 16B–D are cross-sectional views of alternative embodiments of wall configurations for the cavity of FIGS. 15A–B.
Figure 16C:
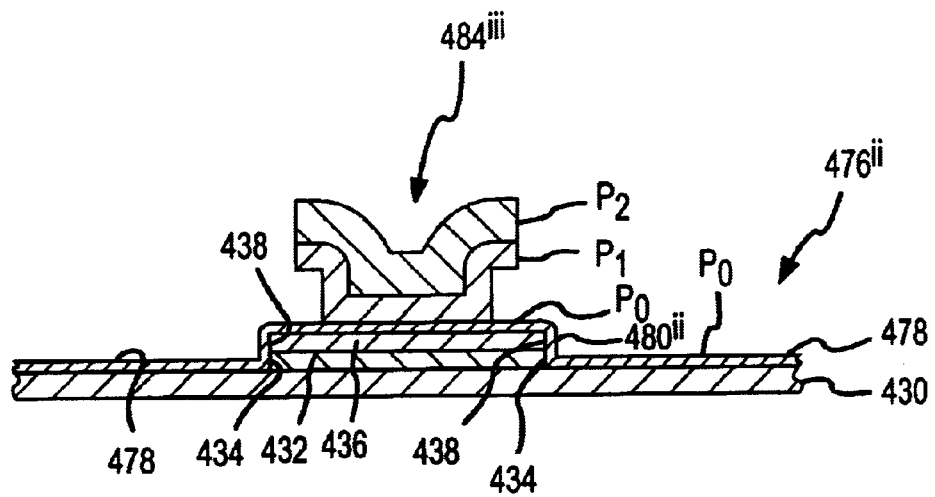
Figure 16D:
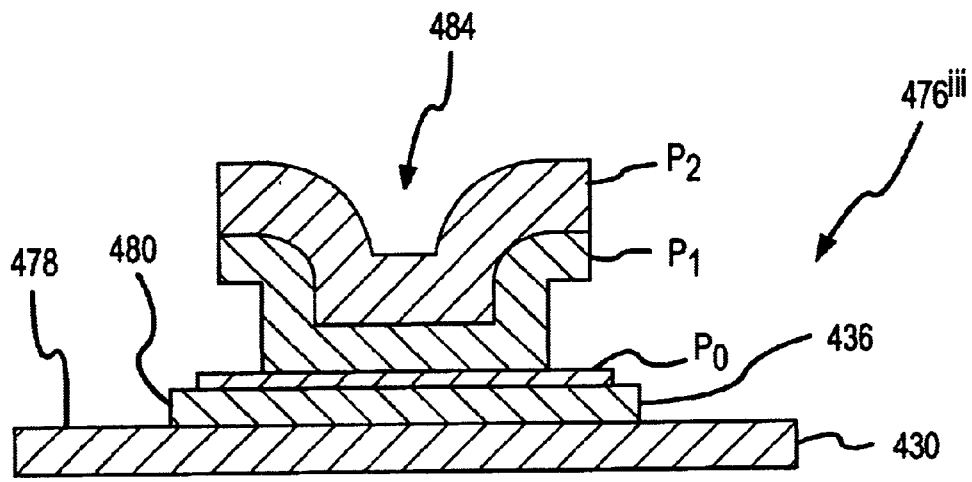

Instead of disposing the anchors for a displacement multiplier outside of a cavity in which the displacement multiplier is positioned to increase the clearance below the displacement multiplier for purposes of compensating for non-collinear forces, these anchors may be positioned entirely within the cavity along with the rest of the displacement multiplier microstructure. FIG. 16B illustrates such a configuration where all of the anchors 484$^i$ for a displacement multiplier (not shown, but having its beams formed from the types of polysilicon layers $P_3$ and $P_4$ illustrated in FIG. 16A discussed above) are located within the cavity 476$^i$, along with the entirety of the displacement multiplier. Like the embodiment of FIG. 16A, both the polysilicon layers $P_0$ and $P_1$ seal the edge surface 434 of the oxide layer 432. However, since the anchor 484$^i$ is entirely disposed within the cavity 476$^i$ in the case of the FIG. 16B embodiment, the edge surface 434 of the oxide layer 432 is annular, as are the portions of the polysilicon layers $P_0$ and $P_1$ that seal this edge surface 434. Another distinction between the FIG. 16A and 16B embodiments is that the configuration of the anchor 484$^i$ is different than that of the anchor 484 illustrated in FIG. 16A.

One benefit provided by the configurations of FIGS. 16A and 16B is that sealing the edge surface 434 of the oxide layer 432 with material from the polysilicon layers $P_0$ and $P_1$ reduces the potential for the release etchant gaining access to the oxide layer 432 through the edge surface 434. In some cases, it may be acceptable to seal the edge surface 434 of the oxide layer 432 with only material from the polysilicon layer $P_0$. This variation is presented in FIG. 16C. As in the FIG. 16B embodiment, the variation of FIG. 16C includes a cavity 476$^{ii}$ that contains the entirety of the displacement multiplier (not shown, but having its beams formed from the types of polysilicon layers $P_3$ and $P_4$ illustrated in FIG. 16A) and all of its anchors 484$^{ii}$ to the substrate 428. Sealing of the edge surface 434 of the oxide layer 432 using only the material from the polysilicon layer $P_0$ could also be employed by the configuration presented in FIG. 16A.

In some cases the microelectromechanical system will not include an oxide layer between the nitride layer 436 and the wafer material 430. In this case, it is not necessary to seal a surface of an oxide layer that is exposed during formation of a cavity for increasing clearance for a displacement multiplier microstructure. This is the variation presented in FIG. 16D. As in the FIGS. 16B–C embodiments, the variation of FIG. 16D includes a cavity 476$^{iii}$ that contains the entirety of the displacement multiplier (not shown, but having its beams formed from the types of polysilicon layers $P_3$ and $P_4$ illustrated in FIG. 16A) and all of its anchors 484$^{iii}$ to the substrate 428. These same principles would be equally applicable to the configuration presented in FIG. 16A.

Any of the above-described embodiments that address the existence of non-collinear forces may be used in any combination with each other. For instance, in one embodiment any of the embodiments of FIGS. 2–7 may be used in combination with any of the embodiments of FIGS. 13, and 15A–16D.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A mirror positioning system, comprising:
    a substrate;
    a mirror;
    a first lever movably interconnected with said substrate, wherein said first lever comprises a first lever end that is movable relative to said substrate, and wherein said mirror is interconnected with a portion of said first lever that is movable relative to said substrate;
    an actuator assembly movably interconnected with said substrate for movement at least generally along a first path;
    a coupling assembly comprising first and second coupling ends, wherein said first coupling end is interconnected with a portion of said first lever that is movable relative to said substrate, wherein said second coupling end is interconnected with said actuator assembly, and wherein said first lever end moves at least generally away from or toward said substrate depending upon a direction which said actuator assembly moves relative to said substrate along said first path; and means for transmitting a force that is exerted on said coupling assembly by at least one of said first lever and said mirror to achieve both first and second conditions, wherein said first condition is that said force is transmitted to said actuator assembly at least generally along said first path, and wherein said second condition is that no portion of said coupling assembly is deflected into contact with any underlying structure.

2. A mirror positioning system, as claimed in claim 1, wherein:

said first path is at least substantially linear.

3. A mirror positioning system, as claimed in claim 1, wherein:

said first path is at least generally parallel with said substrate.

4. A mirror positioning system, as claimed in claim 1, wherein:

said first lever is movably interconnected with said substrate for movement of said first lever end at least substantially along a second path.

5. A mirror positioning system, as claimed in claim 4, wherein:

said second path comprises a component that is at least substantially normal to said substrate.

6. A mirror positioning system, as claimed in claim 4, wherein:

said second path is at least generally arcuate.

7. A mirror positioning system, as claimed in claim 1, wherein:

said coupling assembly comprises an elongated tether located between said first lever and actuator assembly.

8. A mirror positioning system, as claimed in claim 7, wherein:

said coupling assembly further comprises a pivotless compliant microstructure, wherein said pivotless compliant microstructure comprises input and an output sections, wherein said input section is interconnected with said actuator assembly and said output section is interconnected with said elongated tether.

9. A mirror positioning system, as claimed in claim 8, wherein:

said pivotless compliant microstructure comprises a relief structure disposed between and interconnecting said pivotless compliant microstructure and said tether, wherein said means for transmitting in relation to said second condition further comprises said relief structure.

10. A mirror positioning system, as claimed in claim 8, wherein:

said means for transmitting in relation to said second condition comprises a frame assembly pivotally interconnected with said substrate, wherein said pivotless compliant microstructure is mounted on said frame assembly.

11. A mirror positioning system, as claimed in claim 10, wherein:

said frame assembly microstructure is rigid and of one-piece construction.

12. A mirror positioning system, as claimed in claim 10, wherein:

said frame assembly microstructure comprises a plurality of individual frame members that are each individually pivotally interconnected with said substrate, wherein each frame member is prestressed so as to move away from said substrate without an application of any external force to said frame member.

13. A mirror positioning system, as claimed in claim 8, wherein:

said pivotless compliant microstructure is interconnected with said substrate by a first pivotable connection, wherein said means for transmitting in relation to said second condition comprises said first pivotable connection.

14. A mirror positioning system, as claimed in claim 8, wherein:

said means for transmitting in relation to said second condition further comprises at least one cavity formed in said substrate under at least a portion of said pivotless compliant microstructure.

15. A mirror positioning system, as claimed in claim 8, wherein:

said means for transmitting in relation to said second condition further comprises a cavity formed in said substrate, wherein an entirety of said pivotless compliant microstructure is disposed within said cavity.

16. A mirror positioning system, as claimed in claim 8, wherein:

said pivotless compliant microstructure is anchored to said substrate at least at four anchor locations, wherein said means for transmitting in relation to said second condition comprises a location of at least two of said anchor locations.

17. A mirror positioning system, as claimed in claim 1, wherein:

said means for transmitting comprises at least one doubly clamped beam.

18. A mirror positioning system, as claimed in claim 17, wherein:

said at least one doubly clamped beam comprises a plurality of vertically spaced and rigidly interconnected structural layers.

19. A mirror positioning system, as claimed in claim 1, wherein said means for transmitting in relation to said first condition comprises:

a pivotless compliant microstructure interconnected with said substrate and comprising input and output sections that are both movable relative to said substrate within a lateral dimension that is at least generally parallel with said substrate, wherein first lever is interconnected with said output section of said pivotless compliant microstructure and said input section of said pivotless compliant microstructure is interconnected with said actuator assembly, wherein a movement of said actuator assembly relative to said substrate along said first path displaces said input section of said pivotless complaint microstructure a first distance within said lateral dimension, and that in turn displaces said output section of said pivotless compliant microstructure a second distance in said lateral dimension, and wherein said first and second distances are selected from the group consisting essentially of equal and unequal magnitudes.

20. A mirror positioning system, as claimed in claim 19, wherein:

said output section is formed from a single structural layer by surface micromachining and a remainder of said pivotless compliant microstructure is formed from at least two vertically spaced structural layers by surface micromachining and that are anchored to each other at a plurality of locations.

21. A mirror positioning system, as claimed in claim 19, wherein:
  a configuration of said output section and how said output section interconnects with a remainder of said pivotless compliant microstructure comprises said means for transmitting in relation to said second condition.

22. A mirror positioning system, as claimed in claim 19, wherein:
  said pivotless compliant microstructure comprises first and second beam microstructures that are attached to said output section of said pivotless compliant microstructure at a first location, and further extend away from said output section of said pivotless compliant microstructure in at least generally opposite directions, wherein said output section comprises first and second ends, and wherein said first location is disposed at an intermediate location between said first and second ends.

23. A mirror positioning system, as claimed in claim 19, wherein:
  said pivotless compliant microstructure comprises first and second beam microstructures that are attached to said output section of said pivotless compliant microstructure at a first longitudinal location, and further extend away from said output section of said pivotless compliant microstructure in at least generally opposite directions, wherein said output section extends from said first longitudinal location at least generally toward but not to said input section of said pivotless compliant microstructure.

24. A mirror positioning system, as claimed in claim 19, wherein:
  said means for transmitting in relation to said second condition comprises a rigid frame pivotally interconnected with said substrate and said pivotless compliant microstructure being mounted on said frame.

25. A mirror positioning system, as claimed in claim 24, wherein:
  said pivotless compliant microstructure comprises a first portion of said coupling assembly, wherein a second portion of said coupling assembly microstructure is disposed between said input section of said pivotless compliant microstructure and said actuator assembly, and wherein said means for transmitting in relation to said first condition comprises at least one doubly clamped beam that is attached to said second portion of said coupling assembly and that is anchored to said substrate on opposite sides of second portion of said coupling assembly.

26. A mirror positioning system, as claimed in claim 19, wherein:
  said means for transmitting in relation to said second condition comprises a plurality of prestressed elevation members pivotally interconnected with said substrate with said pivotless compliant microstructure being mounted on said plurality of prestressed elevation members.

27. A mirror positioning system, as claimed in claim 26, wherein:
  said pivotless compliant microstructure comprises a first portion of said coupling assembly, wherein a second portion of said coupling assembly microstructure is disposed between said input section of said pivotless compliant microstructure and said actuator assembly, and wherein said means for transmitting in relation to said first condition comprises at lease one doubly clamped beam that is attached to said second portion of said coupling assembly and that is anchored to said substrate on opposite sides of second portion of said coupling assembly.

28. A mirror positioning system, as claimed in claim 19, wherein:
  said means for transmitting in relation to said second condition comprises said pivotless compliant microstructure being interconnected with said substrate at only first and second locations, wherein said pivotless compliant microstructure is pivotally interconnected with said substrate at said first and second locations.

29. A mirror positioning system, as claimed in claim 28, wherein:
  said pivotless compliant microstructure comprises a first portion of said coupling assembly, wherein a second portion of said coupling assembly microstructure is disposed between said input section of said pivotless compliant microstructure and said actuator assembly, and wherein said means for transmitting in relation to said first condition comprises at lease one doubly clamped beam that is attached to said second portion of said coupling assembly and that is anchored to said substrate on opposite sides of second portion of said coupling assembly.

30. A mirror positioning system, as claimed in claim 19, wherein:
  said means for transmitting in relation to said second condition comprises first and second cavities formed in said substrate on opposite sides of a reference axis that extends between said input and output sections of said pivotless compliant microstructure, wherein first and second lateral extremes of said pivotless compliant microstructure are disposed above said first and second cavities, respectively.

31. A mirror positioning system, as claimed in claim 19, wherein:
  said pivotless compliant microstructure is disposed in spaced relation to said substrate and is anchored to said substrate at first and second locations, wherein said first and second anchor locations are disposed on opposite sides of a reference axis that extends between said input and output sections of said pivotless compliant microstructure and that defines a longitudinal dimension whereby said first and second anchor locations are laterally spaced, wherein said pivotless compliant microstructure further comprises first and second lateral extremes that are disposed on opposite sides of said reference axis, wherein said first and second anchor locations are disposed at a longitudinal position from said output section that is at least as great as a longitudinal position of said first and second lateral extremes, wherein said means for transmitting in relation to said second condition comprises a position of said first and second anchor locations relative to said first and second lateral extremes.

32. A mirror positioning system, as claimed in claim 19, wherein:
  said means for transmitting in relation to said second condition comprises a cavity in said substrate, wherein at least a substantial portion of said pivotless compliant microstructure is disposed within said cavity.

* * * * *